United States Patent
Shishikura et al.

[11] Patent Number: 5,990,262
[45] Date of Patent: Nov. 23, 1999

[54] PROCESS FOR PRODUCING POLYCARBONATES

[75] Inventors: Akihiro Shishikura, Chiba; Masahiro Takahashi, Ichihara; Seiji Takahashi, Sodegaura; Noriyuki Kunishi; Hiroaki Motegi, both of Ichihara, all of Japan

[73] Assignee: Idemitsu Petrochemical Co., Ltd., Tokyo, Japan

[21] Appl. No.: 08/875,194

[22] PCT Filed: Feb. 2, 1996

[86] PCT No.: PCT/JP96/00220

§ 371 Date: Sep. 15, 1997

§ 102(e) Date: Sep. 15, 1997

[87] PCT Pub. No.: WO96/23831

PCT Pub. Date: Aug. 8, 1996

[30] Foreign Application Priority Data

| Feb. 3, 1995 | [JP] | Japan | 7-017230 |
| Feb. 3, 1995 | [JP] | Japan | 7-017283 |
| Oct. 10, 1995 | [JP] | Japan | 7-257437 |

[51] Int. Cl.[6] .................................................. C08G 64/00
[52] U.S. Cl. ............................................ 528/196; 528/198
[58] Field of Search ...................................... 528/196, 198

[56] References Cited

FOREIGN PATENT DOCUMENTS

| 59-047228 | 3/1984 | Japan . |
| 3-163131 | 7/1991 | Japan . |
| 3-223330 | 10/1991 | Japan . |
| 5-310905 | 11/1993 | Japan . |

Primary Examiner—Terressa Mosley
Attorney, Agent, or Firm—Frishauf, Holtz Goodman, Langer & Chick, P.C.

[57] ABSTRACT

According to this invention, the prior art problem that relatively many steps and a long time are required for obtaining a high quality polycarbonate of a high molecular weight by a solid phase polymerization method has been solved by subjecting a polycarbonate oligomer to swollen solid phase polymerization under an atmosphere containing a swelling solvent gas or subjecting a polycarbonate oligomer to poor solvent solid phase polymerization under a stream of a poor solvent gas.

29 Claims, 1 Drawing Sheet

● : Toluene
▲ : p-Xylene
○ : Nitrogen gas

● : Toluene
▲ : p - Xylene
○ : Nitrogen gas

PROCESS FOR PRODUCING POLYCARBONATES

TECHNICAL FIELD

This invention relates to a process for producing a polycarbonate.

BACKGROUND ART

The prior method for producing a polycarbonate in industry includes an transesterification method by which a dihydroxy compound and a carbonic acid diester compound are used as the starting materials and these are subjected to transesterification to obtain a polycarbonate.

This transesterification method is roughly classified into a molten transesterification method and a solid phase polymerization method, and hence, these are explained in this order below.

(1) Molten Transesterification Method (JP-A-61-62,522, JP-A-2-153,925)

The case where bisphenol A is used as the dihydroxy compound and diphenyl carbonate is used as the carbonic acid diester compound is taken as an example and explained. This molten transesterification method is a method for producing a polycarbonate which comprises melting bisphenol A and diphenyl carbonate and subjecting them to transesterification reaction in the molten state to eliminate the phenol.

In this molten transesterification method, however, the melting point and melt viscosity of the polycarbonate polymer increase with the progress of polymerization reaction, and hence, a reaction temperature near 300° C. is finally required and a surface renewal by stirring as much as possible and a high vacuum of not more than 1 mm Hg are required for the deaeration-removal of phenol produced as a by-product. Accordingly, in this molten transesterification method, an apparatus enabling high temperature, high vacuum and strong stirring is indispensable and hence the equipment cost increases necessarily.

Moreover, since in this molten transesterification method, the polycarbonate polymer produced is exposed in the vicinity of the decomposition temperature of the polycarbonate for a long period of time, the coloring of the polycarbonate and the deterioration of the polycarbonate due to decomposition reaction and side reactions such as cross-linking, branching and the like are caused with a high possibility.

Accordingly, in the current technique relating to a high viscosity fluid, there is a limit in the molecular weight of a polycarbonate which can be stably produced in industry by the molten transesterification method, and it is considered to be about 20,000 in terms of a viscosity average molecular weight.

(2) Solid Phase Polymerization Method (JP-A-63-223,035, JP-A-1-158,033)

Similarly, the case where bisphenol A is used as the dihydroxy compound and diphenyl carbonate is used as the carbonic acid diester compound is taken as an example and explained. This solid phase polymerization method is a method for producing a high molecular weight polycarbonate which comprises subjecting bisphenol A and diphenyl carbonate to transesterification reaction in the molten state to produce an oligomer, thereafter crystallizing the oligomer by a solvent-treatment, a heat-treatment or the like and subjecting the crystallized oligomer to solid phase polymerization.

This solid phase polymerization method enables the reaction to be conducted at a temperature not higher than the melting point of the polycarbonate (e.g., not more than 240° C.), so that the polycarbonate obtained does not have the problem of coloring polycarbonate which has been recognized in the above molten transesterification method and is superior in quality to the polycarbonate obtained by the molten transesterification method.

However, in this solid phase polymerization method, at least three steps including the oligomerization step, the crystallization step and the solid phase polymerization step are essential, and not only is the production operation complicated, but also a high equipment cost and a high production cost are unavoidable. The solid phase polymerization for obtaining a high molecular weight polycarbonate from the oligomer can be conducted at a low temperature; however, the transesterification reaction rate depends upon the temperature, and the higher the temperature, the higher the reaction rate. Therefore, when the solid phase polymerization is effected at a low temperature, a long reaction time is required. For example, in order to obtain a high molecular weight polycarbonate from the oligomer by the solid phase polymerization process, a reaction time 1.5 to 10 times that in the molten transesterification method is required.

Accordingly, the object of this invention is to provide a process for producing a polycarbonate which has overcome the disadvantages of the conventional method for producing a polycarbonate, especially the solid phase polymerization method and can produce a high quality, high molecular weight polycarbonate in steps as few as possible with a good efficiency in a short time at a low cost.

DISCLOSURE OF INVENTION

The present inventors have repeated the search for achieving the above object, and have consequently found that when a polycarbonate oligomer is subjected to solid phase polymerization under an atmosphere containing a swelling solvent gas, (1) a high molecular weight polycarbonate can be directly obtained without the special crystallization treatment of the oligomer; (2) not only the reaction can be conducted at a lower temperature than in the conventional molten transesterification method, but also the reaction time can be made much shorter than in the conventional molten transesterification method (hence, can be made much shorter than in the conventional solid phase polymerization method); (3) the high molecular weight polycarbonate obtained has a quality comparable to the product obtained in the conventional solid phase polymerization method; etc.

Also, the present inventors have found that when a polycarbonate oligomer is subjected to solid phase polymerization under a stream of a poor solvent gas, (1) a high molecular weight polycarbonate can be directly obtained without any special crystallization treatment of the oligomer; (2) not only the reaction can be conducted at a lower temperature than in the conventional molten transesterification method but also the reaction time can be made the same as or shorter than that in the conventional molten transesterification method (therefore, can be made much shorter than in the convention solid phase polymerization method); (3) the high molecular weight polycarbonate obtained has a quality comparable to that of the product obtained in the conventional solid phase polymerization method; etc.

This invention has been completed based on the above findings, and the gist of the process for producing a polycarbonate of this invention is the solid phase polymerization of a polycarbonate oligomer under an atmosphere containing a swelling solvent gas (this process is referred to hereinafter as the process I).

Moreover, the gist of another process for producing a polycarbonate of this invention is the solid phase polymerization of a polycarbonate oligomer under a stream of a poor solvent gas (this process is referred to hereinafter as the process II).

BEST MODE FOR CARRYING OUT THE INVENTION

Figure 1:
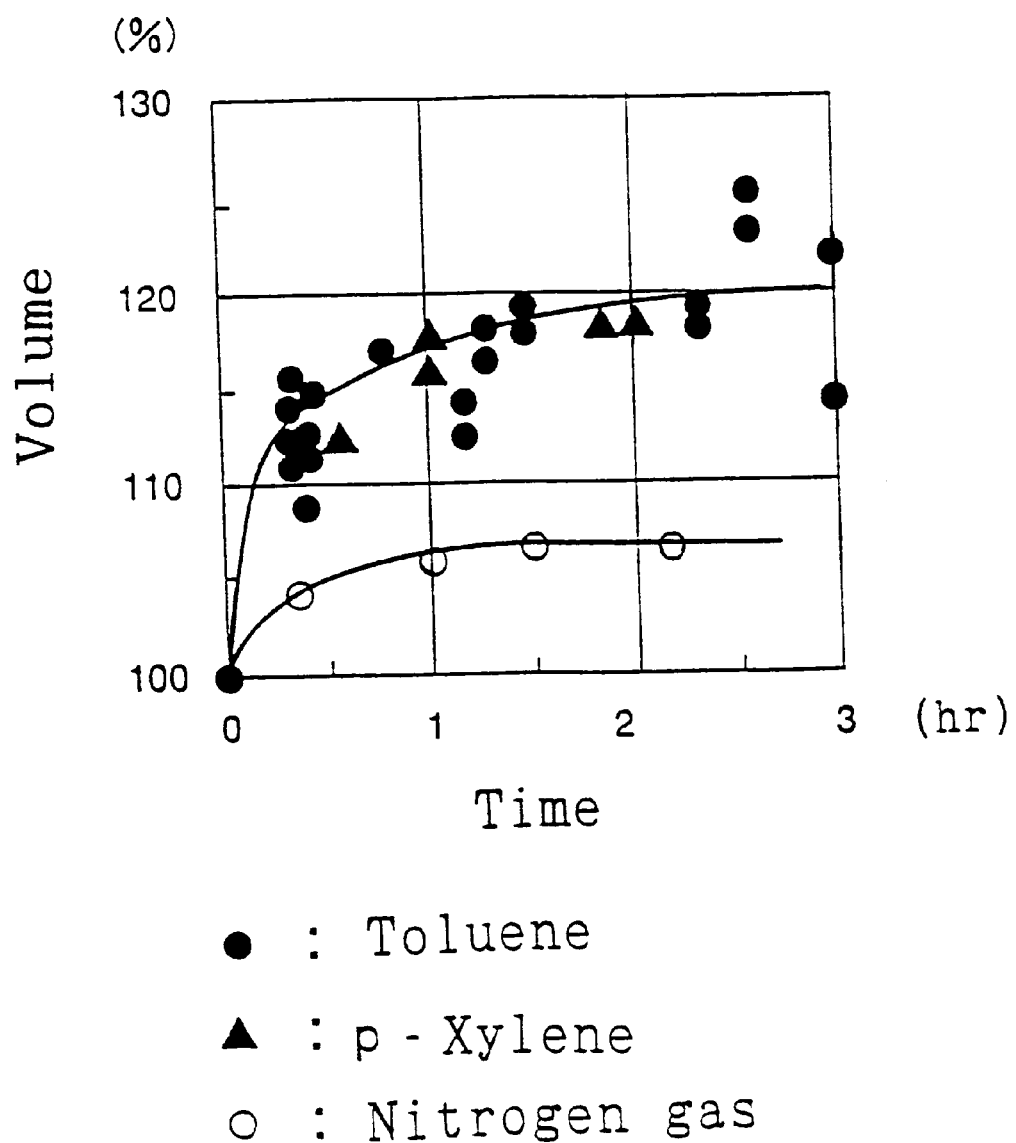
FIG. 1 is a graph showing an example of the swelling effect of the swelling solvent referred to in the process I of this invention.

The process I and the process II are described in detail below.

First of all, the process I is explained. This process I is characterized, as discussed above, by:

(A) using a polycarbonate oligomer as the starting material, and (B) subjecting the polycarbonate oligomer to solid phase polymerization under an atmosphere containing a swelling solvent gas (referred to hereinafter as the swollen solid phase polymerization in some cases), and hence, first of all, (A) the use of a polycarbonate oligomer which is the starting material is explained and then, (B) the swollen solid phase polymerization is explained.

(A) Polycarbonate Oligomer

As the polycarbonate oligomer which is the starting material in the process I, there is used an oligomer obtained by the molten transesterification method or an oligomer obtained by an interface polymerization method using a dihydroxy compound and phosgene.

Therefore, the production of a polycarbonate oligomer by the molten transesterification method is first explained in detail below.

(a1) Polycarbonate Oligomer Obtained by Molten Transesterification Esterification Method (1) Starting Materials for Producing a Polycarbonate Oligomer by the Molten Transesterification Method In the production of a polycarbonate oligomer by the molten transesterification method, the starting materials are not critical, and various materials which are used in the production of a polycarbonate by the conventional transesterification method are used.

For example, (i) a combination of a dihydroxy compound with a carbonic acid diester, (ii) a combination of a diester of a dihydroxy compound with a carbonic acid diester, (iii) a combination of a dicarbonic acid ester of a dihydroxy compound with a carbonic acid diester, (iv) a dicarbonic acid ester of a dihydroxy compound (self-condensation), (v) a monocarbonic acid ester of a dihydroxy compound (self-transesterification) and the like are mentioned.

Among them, (i) a combination of a dihydroxy compound with a carbonic acid diester is preferably used.

In the above case, the dihydroxy compound preferably used in the transesterification reaction includes, for example, aromatic dihydroxy compounds and aliphatic dihydroxy compounds, and is at least one compound selected from these compounds.

The aromatic dihydroxy compound includes aromatic dihydroxy compounds represented by the general formula (I):

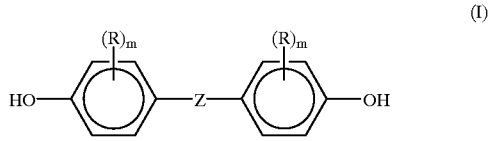

wherein each R is a halogen atom (for example, chlorine, bromine, fluorine or iodine) or an alkyl group having 1 to 8 carbon atoms (for example, methyl group, ethyl group, propyl group, n-butyl group, isobutyl group, amyl group, isoamyl group, hexyl group or the like); when plural R groups are bonded they may be the same or different; m is an integer of 0 to 4; Z is a single bond, an alkylene group having 1 to 8 carbon atoms or an alkylidene group having 2 to 8 carbon atoms (for example, methylene group, ethylene group, propylene group, butylene group, pentylene group, hexylene group, ethylidene group, isopropylidene group or the like), a cycloalkylene group having 5 to 15 carbon atoms or a cycloalkylidene group having 5 to 15 carbon atoms (for example, cyclopentylene group, cyclohexylene group, cyclopentylidene group, cyclohexylidene group or the like), a —S—, —SO—, —SO$_2$—, —O— or —CO— linkage or a group represented by the general formula (II) or (III):

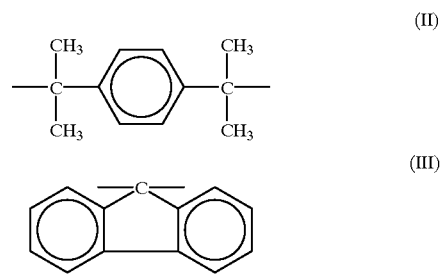

Such aromatic dihydroxy compounds include, for example, bis(hydroxyaryl)alkanes such as bis(4-hydroxyphenyl)methane, bis(3-methyl-4-hydroxyphenyl)methane, bis(3-chloro-4-hydroxyphenyl)methane, bis(3,5-dibromo-4-hydroxyphenyl)methane, 1,1-bis(4-hydroxyphenyl)ethane, 1,1-bis(2-t-butyl-4-hydroxy-3-methylphenyl)ethane, 1-phenyl-1,1-bis(3-fluoro-4-hydroxy-3-methylphenyl)ethane, 2,2-bis(4-hydroxyphenyl)propane [usually called bisphenol A (BPA)], 2,2-bis(3-methyl-4-hydroxyphenyl)propane, 2,2-bis(2-methyl-4-hydroxyphenyl)propane, 2,2-(3,5 -dimethyl-4-hydroxyphenyl)propane, 1,1-bis(2-t-butyl-4-hydroxy-5-methylphenyl)propane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 2,2-bis(3-bromo-4-hydroxy-5-chlorophenyl)propane, 2,2-bis(3-phenyl-4-hydroxyphenyl)propane, 2,2-bis(4-hydroxyphenyl)butane, 2,2-bis(3-methyl-4-hydroxyphenyl)butane, 1,1-bis(2-butyl-4- hydroxy-5-methylphenyl)butane, 1,1-bis(2-t-butyl-4-hydroxy-5-methylphenyl)butane, 1,1-bis(2-t-butyl-4-hydroxy-5-methylphenyl)isobutane, 1,1-bis(2-t-amyl-4-hydroxy-5-methylphenyl)butane, 2,2-bis(3,5-dichloro-4-hydroxyphenyl)butane, 2,2-bis(3,5-dibromo-4-hydroxyphenyl)butane, 4,4-bis(4-hydroxyphenyl)heptane, 1,1-bis(2-t-butyl-4-hydroxy-5-methylphenyl)heptane, 2,2-bis(4-hydroxyphenyl)octane, 1,1-(4-hydroxyphenyl)ethane and the like; bis(hydroxyaryl)cycloalkanes such as 1,1-bis(4- hydroxyphenyl)cyclopentane, 1,1-bis(4-hydroxyphenyl)cyclohexane, 1,1-bis(3-methyl-4-hydroxyphenyl)cyclohexane, 1,1-bis(3-cyclohexyl-4-hydroxyphenyl)cyclohexane, 1,1-bis(3-phenyl-4-hydroxyphenyl)cyclohexane, 1,1-bis(4-hydroxyphenyl)-3,5,5-trimethylcyclohexane and the like; bis(hydroxyaryl)ethers such as bis(4-hydroxyphenyl)ether, bis(4-hydroxy-3-methylphenyl)ether and the like; bis(hydroxyaryl)sulfides such as bis(4-hydroxyphenyl)sulfide, bis(3-methyl-4-hydroxyphenyl)sulfide and the like; bis(hydroxyaryl) sulfoxides such as bis(4-hydroxyphenyl)sulfoxide, bis(3-methyl-4-hydroxyphenyl)sulfoxide, bis(3-phenyl-4-hydroxyphenyl)sulfoxide and the like; bis(hydroxyaryl) sulfones such as bis(4-hydroxyphenyl)sulfone, bis(3-methyl-4-hydroxyphenyl)sulfone, bis(3-phenyl-4-hydroxyphenyl)sulfone and the like; dihydroxybiphenyls such as 4,4'-dihydroxybiphenyl, 4,4'-dihydroxy-2,2'-dimethylbiphenyl, 4,4'-dihydroxy-3,3'-dimethylbiphenyl, 4,4'-dihydroxy-3,3'-dicyclohexylbiphenyl, 3,3'-difluoro-4,4'-dihydroxybiphenyl and the like; etc.

The other aromatic dihydroxy compounds than the abovementioned general formula (I) include dihydroxybenzenes, halogen-substituted and alkyl-substituted dihydroxybenzenes and the like. There are mentioned, for example, resorcinol, 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, 2,3,4,6 -tetrabromoresorcinol, catechol, hydroquinone, 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,5-dichlorohydroquinone, 2,3,5,6-tetramethylhydroquinone, 2,2,4,6-tetra-t-butylhydroquinone, 2,3,5,6-tetrafluorohydroquinone, 2,3,5,6-tetrabromohydroquinone and the like.

The aliphatic dihydroxy compounds include various aliphatic dihydroxy compounds. There are mentioned, for example, butane-1,4-diol, 2,2-dimethylpropane-1,3-diol, hexane-1,6-diol, diethylene glycol, triethylene glycol, tetraethylene glycol, octaethylene glycol, dipropylene glycol, N,N-methyldiethanolamine, cyclohexane-1,3-diol, cyclohexane-1,4-diol, 1,4-dimethylolcyclohexane, p-xylene glycol, 2,2-bis(4-hydroxycyclohexyl)propane, and ethoxylated or propoxylated products of dihydric alcohols or phenols such as bis-hydroxyethyl-bisphenol A, bis-hydroxyethyl-tetrachlorobisphenol A and bis-hydroxyethyl-tetrachlorohydroquinone and the like.

As the dihydroxy compound which is a starting material for polycarbonate oligomer, the above-mentioned compounds are appropriately selected and then used, and among them, it is particularly preferable to use bisphenol A which is an aromatic dihydroxy compound.

The carbonic acid diester, which is used as another starting material, includes various carbonic acid diesters. It is, for example, at least one compound selected from diaryl carbonate compounds, dialkyl carbonate compounds and alkylaryl carbonate compounds.

The diaryl carbonate compound to be used is a compound represented by the general formula (IV):

(IV)

wherein Ar represents an aryl group, or a compound represented by the general formula (V):

(V)

wherein $Ar^1$ represents the residue formed by removing two hydroxyl groups from the above aromatic dihydroxy compound and $Ar^2$ represents an aryl group.

The dialkyl carbonate compound is a compound represented by the general formula (VI):

(VI)

wherein $R^1$ represents an alkyl group having 1 to 6 carbon atoms or a cycloalkyl group having 4 to 7 carbon atoms or a compound represented by the general formula (VII):

(VII)

wherein $R^1$ and $Ar^1$ are as defined above.

And the alkylaryl carbonate compound is a compound represented by the general formula (VIII):

(VIII)

wherein $R^1$ and $Ar^2$ are as defined above or a compound represented by the general formula (IX):

(IX)

wherein $R^1$, $Ar^1$ and $Ar^2$ are as defined above.

Here, the diaryl carbonate compound includes, for example diphenyl carbonate, ditolyl carbonate, bis(chlorophenyl)carbonate, m-cresyl carbonate, dinaphthyl carbonate, bis(diphenyl)carbonate, bisphenol A bisphenyl carbonate and the like.

The dialkyl carbonate compound includes, for example, diethyl carbonate, dimethyl carbonate, dibutyl carbonate, dicyclohexyl carbonate, bisphenol A bismethyl carbonate and the like.

The alkylaryl carbonate compound includes, for example, methylphenyl carbonate, ethylphenyl carbonate, butylphenyl carbonate, cyclohexylphenyl carbonate, bisphenol A methylphenyl carbonate and the like.

As the carbonic acid diester, which is a starting material for polycarbonate oligomer, the above-mentioned compounds are appropriately selected and used, and among them, diphenyl carbonate is particularly preferably used.

As stated above, as the starting materials for the polycarbonate oligomer, in addition to the above dihydroxy compounds and the above carbonic acid diesters, there can also be used diesters of the dihydroxy compounds, dicarbonic acid esters of the dihydroxy compounds and monocarbonic acid esters of the dihydroxy compounds.

The diesters of the dihydroxy compounds include, for example, bisphenol A diacetate, bisphenol A dipropionate, bisphenol A dibutyrate, bisphenol A dibenzoate and the like.

The dicarbonic acid esters of the dihydroxy compounds include, for example, bismethylcarbonic acid ester of bisphenol A, bisethylcarbonic acid ester of bisphenol A, bisphenylcarbonic acid ester of bisphenol A and the like.

The monocarbonic acid esters of the dihydroxy compounds include, for example, bisphenol A monomethylcarbonic acid ester, bisphenol A monoethylcarbonic acid ester, bisphenol A monopropylcarbonic acid ester, bisphenol A monophenylcarbonic acid ester and the like.

Also, a branching agent can be used in the production of the oligomer. Examples of the branching agent include phloroglucinol, trimellitic acid, 1,1,1-tris(4-hydroxyphenyl)ethane, 1-[α-methyl-α-(4'-hydroxyphenyl)ethyl]-4-[α',α'-bis(4"-hydroxyphenyl)ethyl]benzene, α,α',α"-tris(4-hydroxyphenyl)-1,3,5-triisopropylbenzene, isatin bis(o-cresol) and the like.

(2) Conditions for Producing Polycarbonate Oligomer by the Molten Transesterification Method The greatest point in the production of a polycarbonate oligomer by the molten transesterification method is to prevent the carbonic acid diester compound having the highest vapor pressure next to the phenols produced as by-products by the transesterification reaction from being distilled out. For this purpose, in the preparation of the starting mixture, there are adopted a method which comprises first melting the starting dihydroxy compound and carbonic acid diester compound together or separately and then feeding them to a reactor and a method which comprises adding a powder of the carbonic acid diester compound to a molten dihydroxy compound.

The production of the polycarbonate oligomer by the molten transesterification method is preferably carried out at a temperature of 100 to 300° C. at a pressure of 1 Torr to 5 kg/cm$^2$G. The reason therefor is as follows. That is to say, when the reaction temperature is as low as less than 100° C., the transesterification reaction hardly proceeds, while when the reaction temperature is as high as more than 300° C., there is a fear that the starting carbonic acid diester compound may come to be distilled out of the reaction system together with the phenols produced as by-products. When the reaction pressure exceeds 5 kg/cm$^2$G, the phenols produced as by-products are not distilled off and the reaction equilibrium does not shift, so that the reaction does not proceed. On the contrary, when the reaction pressure is less than 1 Torr, the starting carbonic acid diester compound comes to be distilled off and the composition in the reaction system comes to be varied.

The reaction temperature is particularly preferably 150 to 280° C. and the reaction pressure is particularly preferably 10 Torr to 2 kg/cm$^2$G.

As discussed above, the distilling out of the unreacted carbonic acid diester compound during the transesterification reaction is closely correlated to temperature and pressure (the higher the temperature and the higher the degree of vacuum, the more easily the compound is distilled out). Therefore, in order to control the temperature and pressure conditions, it is preferable to compute the degree of progress of the reaction from the distillation rate of the by-produced phenols and the viscosity of the oligomer, feed back and control them. When the distilled phenols are recovered, a packed column and a distillation column are provided between the reactor and a condenser, whereby it is made possible to return the carbonic acid diester compound distilled out to the reactor and reduce the amount of the carbonic acid diester compound distilled out.

The reactor may be any known polymerizer, and preferable are, for example, an upright reactor and a horizontal reactor which are temperature-controlled by a jacket, an external heat-exchanger or the like and provided with a stirrer. The production process may consist of only one step or it is possible to produce separately in more steps, and as the reactor, at least one reactor may be connected in series or in parallel and used to affect reaction.

The transesterification reaction may be either a batch-wise system or a continuous system or a combination of the two; however, a continuous system is preferable for obtaining a uniform oligomer.

In the production of a polycarbonate oligomer by the transesterification method, a polymerization catalyst is not particularly necessary; however, an transesterification catalyst which is usually used may be employed if necessary.

Here, the transesterification catalyst which is usually used includes, for example, alkali metal compounds (e.g., lithium hydroxide, sodium hydroxide, potassium hydroxide and the like); alkaline earth metal compounds; nitrogen-containing basic compounds such as amines, quaternary ammonium salts and the like; boron compounds; and the like. Among them, nitrogen-containing basic compounds are particularly preferably used because they are characterized in that they exhibit basicity and do not relatively remain in the reaction system.

When an transesterification catalyst is used as the polymerization catalyst, as the above nitrogen-containing compound, there can be mentioned, for example, an aliphatic tertiary amine compound such as trimethylamine, triethylamine, tripropylamine, tributylamine, tripentylamine, trihexylamine, dimethylbenzylamine or the like; or an aromatic tertiary amine such as triphenylamine or the like.

There can also be mentioned nitrogen-containing heterocyclic compounds such as N,N-dimethyl-4-aminopyridine, 4-diethylaminopyridine, 4-pyrrolidinopyridine, 4-aminopyridine, 2-aminopyridine, 2-hydroxypyridine, 4-hydroxypyridine, 2-methoxypyridine, 4-methoxypyridine, imidazole, 2-methylimidazole, 4-methylimidazole, 2-dimethylaminoimidazole, 2-methoxyimidazole, 2-mercaptoimidazole, aminoquinoline, diazabicyclooctane (DABCO) and the like.

Moreover, there are mentioned ammonium hydroxides having an alkyl group, an aryl group, an alkyl-aryl group or the like such as tetramethylammonium hydroxide (Me$_4$NOH), tetraethylammonium hydroxide (Et$_4$NOH), tetrabutylammonium hydroxide (Bu$_4$NOH), trimethylbenzylammonium hydroxide [C$_6$H$_5$CH$_2$(Me)$_3$NOH] and the like.

In addition, there are mentioned basic salts such as tetramethylammonium borohydride (Me$_4$NBH$_4$), tetrabutylammonium borohydride (Bu$_4$NBH$_4$), tetrabutylammonium phenylborate (BU$_4$NBPh$_4$), tetramethylammonium tetraphenylborate (Me$_4$NBPh$_4$) and the like.

Among these nitrogen-containing basic compounds, preferably used are trihexylamine, tetramethylammonium hydroxide, tetrabutylammonium hydroxide and dimethylaminopyridine.

As the boron compound, there are mentioned, for example, boric acid, trimethyl borate, triethyl borate, tributyl borate, triheptyl borate, triphenyl borate, trinaphthyl borate and the like.

The amount of the above catalyst added is usually $5 \times 10^{-2}$ to $5 \times 10^{-9}$ mol, preferably $5 \times 10^{-3}$ to $5 \times 10^{-8}$ mol, per mole of the terminal hydroxyl group of the starting dihydroxy compound. When the amount of this catalyst added is less than $5 \times 10^{-9}$ mol, there is a fear that the effect of the catalyst may not be exhibited. Also, when the amount exceeds $5 \times 10^{-2}$ mol, there is a fear that the physical properties of the final product polycarbonate, particularly heat resistance and hydrolysis resistance may be deteriorated, resulting in an increase of cost, so that it is not necessary to add the catalyst in an amount exceeding said amount.

The above-mentioned molten transesterification method is carried out in the absence of a solvent; however, an inert solvent may, if necessary, be used in an amount of 1 to 150% by weight based on the weight of the polycarbonate to be obtained.

In this case, the inert solvent includes, for example, aromatic compounds such as diphenyl ether, halogenated diphenyl ether, benzophenone, polyphenyl ether, dichlorobenzene, methylnaphthalene and the like; gases such as carbon dioxide, nitrogen monoxide, nitrogen and like; chlorofluorohydrocarbons; alkanes such as ethane, propane and the like; cycloalkanes such as cyclohexane, tricyclo(5.2.10)decane, cyclooctane, cyclodecane and the like; alkenes such as ethane, propene and the like; etc.

(3) Polycarbonate Oligomer Produced by the Molten Transesterification Esterification Method The polycarbonate oligomer produced under the conditions shown in (2) above has preferably a viscosity average molecular weight of about 1,500 to about 30,000, particularly preferably about 3,000 to about 30,000. When the molecular weight of the polycarbonate oligomer is low, the melting point becomes low and it becomes necessary to lower the swollen solid phase polymerization temperature which will be discussed hereinafter, whereby the reaction rate becomes low.

The terminal ratio of polycarbonate oligomer is preferably in the range of the phenyl carbonate terminal: hydroxyl group terminal=1:4 to 4:1. The reason therefor is that when the terminal ratio is outside this range, the ultimate molecular weight of the polycarbonate finally obtained after the solid phase polymerization is limited and the desired increasing of molecular weight becomes difficult. The terminal ratio is preferably in the range of from 1:1.5 to 1.5; 1, particularly preferably in the range of from 1:1 to 1.1:1.

Since the production of a polycarbonate oligomer by the molten transesterification method has been explained, a detailed explanation is made below of the production of a polycarbonate oligomer by the interface polymerization method.

(a2) Polycarbonate Oligomer by the Interface Polymerization Method

As a method for producing a polycarbonate oligomer by the interface polymerization method, there are mentioned:

(i) a method which comprises using phosgene and an aromatic dihydroxy compound, separately producing a phenyl carbonate-terminated oligomer and a hydroxyl group-terminated oligomer by the interface polymerization method and obtaining an oligomer in which the ratio of the phenyl carbonate terminal to the hydroxyl group terminal has been adjusted, (ii) a method which comprises using phosgene and an aromatic dihydroxy compound, producing a phenyl carbonate-terminated oligomer by the interface polymerization method, adding a dihydroxy compound to obtain an oligomer in which the ratio of the phenyl carbonate terminal to the hydroxyl group terminal has been adjusted, and the like.

The aromatic dihydroxy compound and dihydroxy compound used in the above methods (i) and (ii) have been illustrated above, and hence, the explanation thereof is omitted. Also, the above methods (i) and (ii) per se are known and hence the explanation thereof is omitted.

As a method other than the above methods (i) and (ii), the present inventors have found a novel process for producing a polycarbonate oligomer (called prepolymer in some cases) by the interface polymerization method.

Therefore, this novel process for producing a polycarbonate oligomer by the interface polymerization method is explained below.

Novel Process for Producing Polycarbonate Oligomer by the Interface Polymerization Method (1) Starting Materials for Producing Polycarbonate Oligomer by the Novel Process A dihydroxy compound and a monohydroxyaryl compound are used together with phosgene. Among them, as the dihydroxy compound, there can be used aromatic dihydroxy compounds and aliphatic dihydroxy compounds which are used in the production of an oligomer by the molten transesterification method; however, it is preferable to use the aromatic dihydroxy compounds. Specific examples of these dihydroxy compounds have already been mentioned, and hence, they are not illustrated here.

The monohydroxyaryl compound includes phenol, o-n-butylphenol, m-n-butylphenol, p-n-butylphenol, o-isobutylphenol, m-isobutylphenol, p-isobutylphenol, o-t-butylphenol, m-t-butylphenyl, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 2,5-dicumylphenol, 3,5-dicumylphenol and compounds represented by the formulas:

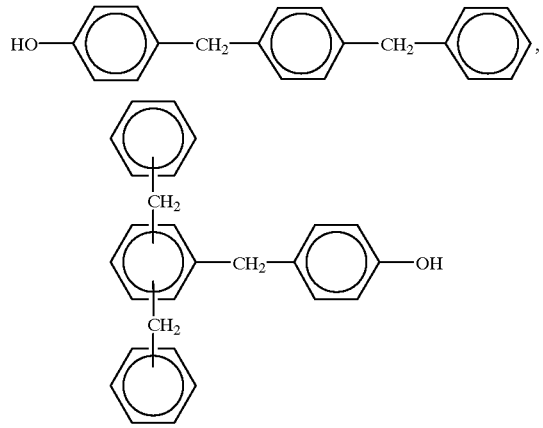

and as chroman derivatives, for example, compounds represented by the formulas:

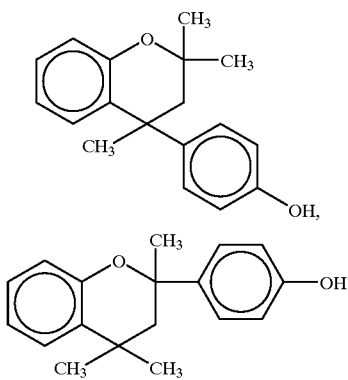

and the like.

Among such phenols, preferable are p-t-butylphenol, p-cumylphenol, p-phenylphenol and the like.

Also, compounds represented by the formulas: cumylphenol, p-phenylphenol and the like.

Also, compounds represented by the formulas:

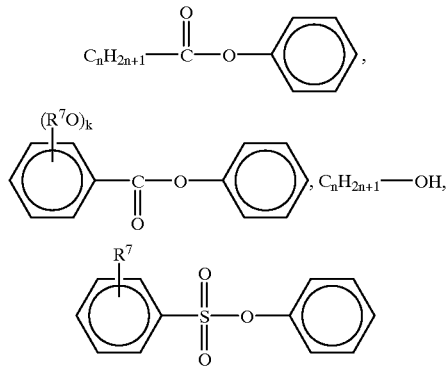

(wherein n is an integer of 7 to 30 (wherein $R^7$ is an alkyl group having 1 to 7 carbon atoms and k is an integer of 1 to 3.)
and the like can be used.

(2) Conditions for Producing a Polycarbonate Oligomer by the Novel Process

The present process for producing a polycarbonate oligomer consists of a step of preparing a chloroformate-terminated oligomer and a step of further reacting the chloroformate-terminated oligomer obtained in the above step to prepare a prepolymer for the reaction for increasing molecular weight. These steps are explained successively below.

(i) Step of preparing chloroformate-terminated oligomer

The chloroformate-terminated oligomer is prepared by a known interface polycondensation method using phosgene and an aromatic dihydroxy compound as the starting materials. Specifically, a chloroformate-terminated oligomer can be obtained by dissolving the aromatic dihydroxy compound in an aqueous solution of an alkali metal hydroxide to prepare an aqueous alkali hydroxide solution of the aromatic dihydroxy compound, adding an organic solvent thereto and blowing an excess of phosgene to allow them to react.

The alkali metal hydroxide includes sodium hydroxide, potassium hydroxide, lithium hydroxide, cesium hydroxide and the like, and preferable are sodium hydroxide and potassium hydroxide.

As the organic solvent, a halogen-containing solvent is used. Examples of the halogen-containing solvent include dichloromethane, trichloromethane, 1,1-dichloroethane, 1,1,1-trichloroethane, 1,1,2-trichloroethane, 1,1,1,2-tetrachloroethane, 1,1,2,2-tetrachloroethane, pentachloroethane, chlorobenzene, dichlorobenzene, chlorofluorohydrocarbons and the like, among which dichloromethane is preferable.

The general formula for the chloroformate oligomer obtained is as follows:

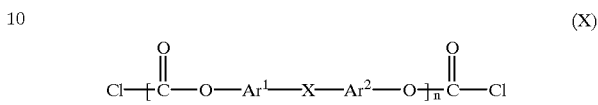

wherein $Ar^1$ and $Ar^2$ are arylene groups or substituted arylene groups (may be the same or different), X is an alkylene group or a substituted alkylene group, and n represents an average degree of polymerization which is in the range of from 1 to 10.

The chloroformate-terminated oligomer of the above general formula (X) is recovered as an organic solvent solution.

(ii) Step of preparing a prepolymer for reaction for increasing molecular weight The prepolymer for reaction for increasing molecular weight is a prepolymer having mainly phenyl group and hydroxyl group terminals and having a degree of polymerization of 5 to 30 because of the transesterification reaction to be effected in the step of increasing molecular weight, and the ratio of the phenyl group terminal to the hydroxyl group terminal is preferably such that the proportion of the phenyl group terminal is 30 to 70 mol % of the total terminals. When the ratio exceeds this range, the increasing of molecular weight becomes impossible. Ideally, the proportion of the phenyl group terminal is 40 to 60 mol %, and particularly, it is better to adjust the proportion to 30 to 70 mol % or a vicinity thereof.

In this step, in order to obtain a prepolymer for reaction for increasing molecular weight in which prepolymer the degree of polymerization is 5 to 30 and the proportion of phenyl group terminal is 30 to 70 mol %, the reaction is effected by any of the following methods:

(a) a method which comprises reacting a monohydroxyaryl compound and thereafter reacting a dihydroxy compound, and (b) a method which comprises simultaneously reacting a monohydroxyaryl compound and a dihydroxy compound.

In the above method (a), first of all, for introducing the phenyl terminal, a monohydroxyaryl compound is mixed with a chloroformate-terminated oligomer reaction mixture and the resulting mixture is subjected to reaction with stirring for 10 to 120 minutes, preferably about 15 to 90 minutes.

At this time, the above-mentioned phenyl group terminal ratio can be obtained by reacting the monohydroxyaryl compound in a proportion of 0.3 to 0.7 mol per mole of the chloroformate group contained in the starting chloroformate terminated oligomer as determined by a silver nitrate titration method or the like. The monohydroxyaryl compound is preferably mixed in the form of an aqueous alkali hydroxide solution. The concentration of the aqueous alkali hydroxide solution in which the monohydroxyaryl compound is dissolved is preferably about 5 to 10% by weight, and at this time, it is necessary to allow the alkali hydroxide to exist in a proportion of 1.0 to 3.0 mols per mole of the monohydroxyaryl compound.

Subsequently, for increasing the degree of polymerization and introducing a hydroxyl group terminal, a dihydroxy compound is mixed with the above reaction mixture and the resulting mixture is subjected to reaction with stirring in the same manner for a period of 5 to 90 minutes, more preferably 15 to 90 minutes or so.

At this time, a phenyl group and hydroxyl group terminated polycarbonate oligomer can be obtained by allowing the dihydroxy compound to react in a proportion of 2.3 to 16.7 mols per mole of the chloroformate group contained in the starting chloroformate terminated oligomer as determined by a silver nitrate titration method or the like. The dihydroxy compound is preferably mixed in the form of an aqueous alkali hydroxide solution. The concentration of the aqueous alkali hydroxide solution in which the dihydroxy compound is dissolved is preferably about 5 to 10% by weight, and at this time it is necessary that the alkali hydroxide be allowed to exist in such an amount that the dihydroxy compound can be neutralized, in the aqueous solution.

In the method (a), it is possible to add a known transesterification catalyst such as a tetraalkylamine or the like.

Next, the above method (b) is explained. When according to this method (b), the monohydroxyaryl compound and the dihydroxy compound are simultaneously subjected to reaction to prepare a phenyl group and hydroxyl group terminated prepolymer from the chloroformate terminated oligomer, it is sufficient to mix simultaneously an aqueous alkali hydroxide solution of the monohydroxyaryl compound and an aqueous alkali hydroxide solution of the dihydroxy compound with the starting chloroformate terminated oligomer reaction mixture and subject the mixture to reaction with stirring for a period of 10 to 120 minutes, more preferably 15 to 90 minutes or so.

In this method (b), it is also possible to add a known transesterification catalyst such as a tetraalkylamine or the like.

The prepolymers for reaction for increasing molecular weight prepared by the method (a) or (b) are represented by the general formulas (XI), (XII) and (XIII):

unwashed state for increasing molecular weight, a remarkable quality deterioration is exhibited.

The novel process for producing a polycarbonate oligomer (prepolymer) by the interface polymerization method which process has been found by the present inventors has been explained above; however, the oligomer (prepolymer) obtained by this novel process is converted to a high molecular weight polymer by not only the swollen solid phase polymerization method of the process I mentioned hereinafter but also the swollen solid phase polymerization method of the process II mentioned hereinafter and the known solid phase polymerization under an inert gas stream to give a polycarbonate.

The polycarbonate oligomer obtained by the above molten transesterification method or interface polymerization method is preferably flaked and then subjected to swollen solid phase polymerization in the same manner as in the conventional solid phase polymerization method. Therefore, this flaking is explained below.

The flaking of the polycarbonate oligomer can be carried out in the known manner. There can be used, for example, a rolling granulation method, an extrusion granulation method, a compression granulation method, a melt granulation method, a spray-drying granulation method, a fluidized bed granulation method, a grinding granulation method, an agitation granulation method, a liquid phase granulation method, a vacuum-freezing granulation method and the like.

The shape of the flake is not critical, but in view of operability, preferable are pellet-shape, beads-shape, granule-shape and powder-shape. Moreover, an aggregate of fine particles and a porous product are preferred, and when the oligomer is prepared by the molten transesterification method, a method comprising producing fine particles and aggregating the same is preferably used alone or in combination with the above-mentioned methods. Also, an agitation granulation method is effective which comprises first dissolving the oligomer in a swelling solvent which is used in the swollen solid phase polymerization, and then flaking the oligomer while mixing therewith a poor solvent for polycarbonate. The specific surface area of the particle is

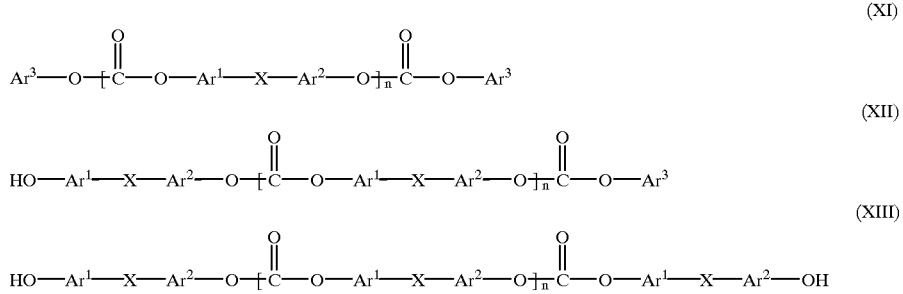

wherein $Ar^1$, $Ar^2$ and $Ar^3$ are arylene groups or substituted arylene groups (may be the same or different); X is an alkylene group or a substituted alkylene group and n is an average degree of polymerization which is in the range of from 5 to 30.

The above prepolymer is obtained in the form of a halogen-containing solvent solution. In the same manner as in the known interface polymerization method, it is necessary to wash the prepolymer solution with an aqueous alkali solution, an aqueous acid solution and pure water to remove electrolytic components because upon heating in the preferably 0.10 to 30 $m^2/g$ or more. When this specific surface area exceeds 30 $m^2/g$, a reduction of bulk density or the like is caused and hence such a problem is caused that the expansion of the effective volume of equipment becomes necessary.

Furthermore, it has been confirmed that pellets obtained by dissolving (or solvent-substituting) an oligomer in a swelling solvent (the kind is described hereinafter) which is to be used in the subsequent step, and aggregating precipitated fine particles by a method comprising cooling and simultaneously molding the solution or spherical particles obtained by cooling the solution in water whose temperature is controlled to 30° C. or more and aggregating the precipitated particles are suitable.

Since the particle diameter of the flake affects the operability and the flow velocity of a swelling solvent gas in the swollen solid phase polymerization, the particle diameter is preferably in the range of from 10 microns to 10 cm, particularly preferably 100 microns to 1 cm. When the particle diameter is too small, there is a possibility that fine powder is entrained by a stream of the swelling solvent gas to cause blocking of valves and pipings, adverse influence on the solvent-recovery step and the like. Also, when the particle diameter becomes large, the distance of the solvent diffusion is increased and no swelling effect is obtained, for which a long time becomes necessary for reaction.

The flaking conditions are varied depending upon the molecular weight of the oligomer, the granulation method, and in the case of a system in which a solvent is used, depending upon the kind and boiling point of the solvent used. If anything, the temperature is at least 20° C. The flakes obtained can be used in the swollen solid phase polymerization without being subjected to special drying treatment.

The flaking has been explained above; however, in the process I, such a crystallization operation as required in the conventional solid phase polymerization can be omitted, whereby a merit is obtained by simplification of the process.

(B) Swollen Solid Phase Polymerization

This swollen solid phase polymerization is the nucleus of the process I, and consists of subjecting the above polycarbonate oligomer to solid phase polymerization under an atmosphere containing a swelling solvent gas.

The point of this swollen solid phase polymerization lies in using a swelling solvent gas for swelling the high polymer based on the conception that when low molecular weight compounds such as phenols produced as by-products are removed by deaeration or extraction, the removal by deaeration or extraction of the low molecular weight compounds from macromolecules (oligomers and their higher polymers) in the swollen state is higher in mass transfer velocity and also higher in efficiency than the removal by deaeration or extraction of the low molecular weight compounds from highly viscous, molten high polymers and crystallized solids.

According to the swollen solid phase polymerization of the process I, the transferability of carbonate molecular chains is improved by absorption of the swelling solvent and the reaction rate is markedly increased (the chemical-reaction-rate-determination is remarkably improved) and simultaneously the reaction rate is greatly improved also by removing at a high efficiency the phenols produced as by-products. As a result, the reaction at a lower temperature is made possible as compared with the molten transesterification method and the quality of polycarbonate can be enhanced. Also, the reaction time can be greatly shortened as compared with not only the conventional solid phase polymerization method but also the molten transesterification method.

In JP-A-1-158,033 disclosing the conventional solid phase polymerization method, it is stated that an inert gas such as nitrogen, argon, helium, carbon dioxide or the like, or a lower hydrocarbon gas may be introduced into a reactor in the solid phase polymerization of a polycarbonate oligomer.

However, these gases have only an effect of lowering the partial pressure of the phenols produced as by-products in the gas phase of the reactor (improving the by-product-diffusion-rate-determination in the particles) and cannot exhibit the effect brought about by the swelling solvent gas used in the process I, namely such a marked effect that the oligomer is swollen to accelerate the removal by distillation of the phenols produced as by-products, thereby increasing remarkably the reaction rate.

The swelling solvent used in the process I means a solvent which, when gasified, can convert a polycarbonate oligomer and its higher polymer to the swollen state under the polymerization conditions.

The term "the swollen state" here means the state that the polycarbonate oligomer and its higher polymer has absorbed the swelling solvent and the volume and weight thereof have increased.

However, in actual operation, it is difficult to confirm whether or not a certain solvent can convert a polycarbonate oligomer and its higher polymer to the "swollen state", and hence, it is judged indirectly by the following method (a) or (b) whether or not a solvent is "the solvent which can convert a polycarbonate oligomer and its higher polymer to the swollen state under the polymerization conditions" referred to in the process I:

(a) A standard sample of a polycarbonate, namely a non-crystalline polycarbonate obtained by the interface polymerization method which has a viscosity average molecular weight of 22,000 and a crystallinity of 0.5% (glass transition point: 147–148° C.) is molded into a plate having a size of 2×5×0.3 cm (this molded article is referred to hereinafter as the sample); this sample is placed in a vessel filled with a test solvent (vapor or gas) at 200° C. (under the atmospheric pressure); and the volume change is measured with time. At this time, it is checked whether or not the volume of the above sample has substantially increased, after an elapse of the predetermined time from the placing of the sample in the vessel, by absorption of the solvent over the thermally swollen state as compared with the initial volume (the volume before the placing of the sample in the vessel; at room temperature) (including reduction of specific volume by crystallization). When the volume has substantially increased, the solvent is defined as the "solvent which can convert a polycarbonate oligomer and its higher polymer to the swollen state under the polymerization conditions" referred to in the process I.

For the sake of reference, the measurement results obtained when toluene and p-xylene are used as solvents and the measurement results obtained when a nitrogen gas is used in place of the solvent are shown in FIG. 1. From FIG. 1, it is seen that in the cases of toluene and p-xylene, the volume (at room temperature) of the sample after 1 to 3 hours is approximately 110–130% and when a nitrogen gas is used, the volume of the sample after the same time is 107% of the initial volume, and therefore, toluene and p-xylene are positioned as the "solvent which can convert a polycarbonate oligomer and its higher polymer to the swollen state under the polymerization conditions" referred to in the process I.

(b) Under the same conditions as in the above process (a), the weight change of a sample is measured and it is judged whether or not the weight of the sample has substantially increased by absorbing a test solvent as compared with the initial weight (the weight before the placing in vessel). When the weight has substantially increased, the solvent is determined as the "solvent which can convert a polycarbonate oligomer and its higher polymer to the swollen state under the polymerization conditions" referred to in the process I.

In the process I, if when the crystallinity of the sample is measured under the same conditions as in (a) above, the crystallinity increases at a larger rate than 1%/hour by absorption or passing of the test solvent, said solvent is also included in the "solvent which can convert a polycarbonate oligomer and its higher polymer to the swollen state under the polymerization conditions" referred in this invention.

As the swelling solvent, preferable is a solvent which can bring about the swollen state, has such a boiling point that the solvent can completely vaporized under the polymerization conditions or a corresponding vapor pressure (50 mm Hg or more, preferably 200 mm Hg or more) and can dissolve a pellet-form non-crystalline polycarbonate having a viscosity average molecular weight of 22,000 and a crystallinity of 0.5% in a proportion of 1.5 to 50% by weight under a temperature condition of 135° C. in a closed system.

Here, the above "pellet-form non-crystalline polycarbonate" means pellets having a diameter of 2.5 mm and a length of 3.5 mm obtained by molding a standard sample of a polycarbonate, that is to say, a non-crystalline polycarbonate having a viscosity average molecular weight of 22,000 and a crystallinity of 0.5% (glass transition temperature: 147–148° C.) obtained by the interface polymerization method. Also, the "solvent which can dissolve the pellet-form non-crystalline polycarbonate in a proportion of 1.5 to 50% by weight under a temperature condition of 135° C. in a closed system" means a solvent which when placed together with the pellet-form non-crystalline polycarbonate in an amount 1 to 20 times the amount of the non-crystalline polycarbonate in a closable vessel and kept at 135° C. for two hours therein, can dissolve the above non-crystalline polycarbonate in a proportion of 1.5 to 50% by weight in the supernatant liquid. In this case, any closable vessel can be used and t he atmosphere in the vessel in the closed state is composed mainly of the vapor of the above-mentioned solvent. The solubility is calculated from the weight change obtained by sampling the above-mentioned supernatant liquid into a glass tube or a metal tube previously heated while controlling the pressure and drying the solvent at a reduced pressure at approximately 110–200° C. depending upon the boiling point of the solvent.

In the above-mentioned swelling agent are included, for example, aromatic compounds and oxygen-containing compounds having a solubility parameter of 4–20 $(cal/cm^3))^{1/2}$, preferably 7–14 $(cal/cm^3)^{1/2}$. The aromatic compounds include aromatic hydrocarbons having 6 to 20 carbon atoms such as benzene, toluene, xylene, ethylbenzene, diethylbenzene, propylbenzene, dipropylbenzene, butylbenzene, methylstyrene, isopropylbenzene, isobutylbenzene, cymene, tetramethylbenzene, terphenyl and the like. The oxygen-containing compounds include ethers such as tetrahydrofuran, dioxane, anisole, phenetole, furan and the like; ketones such as methyl ethyl ketone, methyl isobutyl ketone, methyl isopropyl ketone, pentanone and the like; etc. As the swelling solvent, it is particularly preferable to use an aromatic hydrocarbon having 6 to 20 carbon atoms. These swelling agents may be used alone or in admixture of two or more.

In the process I, for controlling the swollen state, to the atmosphere containing the above-mentioned swelling solvent can be added a gas of a poor solvent for the polycarbonate oligomer or its higher polymer and/or an inert gas. The poor solvent is required to be a solvent in which the solubility of the polycarbonate oligomer or its higher polymer is not more than 0.1% by weight and which does not participate the polymerization reaction. Such poor solvents include cyclic hydrocarbons having 5 to 20 carbon atoms, preferably 5 to 10 carbon atoms; straight chain or branched chain saturated hydrocarbons having 4 to 18 carbon atoms, preferably 6 to 12 carbon atoms; and lower unsaturated hydrocarbons having 4 to 18 carbon atoms, preferably 6 to 10 carbon atoms. These poor solvents may be used alone or in admixture of two or more. As the inert gas, there can be used helium, argon, nitrogen, carbon dioxide and hydrocarbons having 1 to 3 carbon atoms such as methane, ethane, propane, ethylene, propylene and like.

When the atmosphere containing a swelling solvent gas contains a poor solvent gas along with the swelling solvent gas, the proportion of the swelling solvent to the poor solvent is preferably 1/99–100/0 (wt./wt.), particularly preferably 20/80–100/0 (wt./wt.).

When the atmosphere containing a swelling solvent gas contains an inert gas along with the swelling solvent gas, the proportion of the swelling solvent gas to the inert gas (the volume ratio at the reaction temperature) is preferably 1/99–100/0 (vol./vol.), particularly preferably 5/95–100/0 (vol./vol.).

When the boiling points of both the swelling solvent and the poor solvent exceed 250° C., it becomes difficult to remove the remaining solvents and there is a possibility that the quality is deteriorated, so that it is preferable that both the swelling solvent and the poor solvent have boiling points of not more than 250° C.

Incidentally, solvents having a functional group having a relatively high hydrogen-bondability such as hydroxyl group, carboxyl group, amino group, amido group, cyano group, nitro group, sulfone group or the like should not be used because they have a possibility of participating the transesterification at a polymerization temperature exceeding 150° C. Moreover, it is not desirable to use halogen-containing solvents from the viewpoint of environmental aspect.

The swollen solid phase polymerization is preferably carried out at a temperature ranging from 100° C. to the melting point of the oligomer at a pressure of 10 Torr to 5 $kg/cm^2G$. When the reaction temperature is as low as less than 100° C., the transesterification does not proceed, while when the reaction temperature is such a high temperature as to exceed the melting point of the oligomer, it is difficult to keep the swollen solid phase state and such phenomena as fusion-bonding and the like are caused between particles, whereby the running operability is remarkably lowered. The reaction temperature is preferably 180–290° C., particularly preferably 150–220° C. The reaction pressure is particularly preferably atmospheric pressure. Incidentally, the above-mentioned reaction temperature means the temperature of the oligomer measured at the inlet of the reactor and the above-mentioned reaction pressure means the pressure measured at the outlet of the reactor.

It is particularly preferable to start the polymerization at a temperature ranging from the glass transition point of the oligomer to the melting point of the oligomer and carry out the polymerization under the constant temperature conditions or the reaction temperature conditions or carry out the polymerization while elevating the temperature as the reaction proceeds.

As the polymerization catalyst in the swollen solid phase polymerization, the catalyst which has been added at the time of the preparation of the oligomer and remains may be used as it is. However, it is preferable to add the polymerization catalyst in the form of a powder, liquid or gas again in the swollen solid phase polymerization because the solid phase polymerization rate is further increased. Also, it is possible to improve the quality by adding, if necessary, an end-terminator in the form of a powder, liquid or gas.

Specific examples of said end-terminator include monohydric phenols such as o-n-butylphenol, m-n-butylphenol, p-n-butylphenol, o-isobutylphenol, m-isobutylphenol, p-isobutylphenol, o-t-butylphenol, m-t-butylphenol, p-t-pentylphenol, o-n-hexylphenol, m-n-heyxlphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 2,5-dicumylphenol, 3,5-dicumylphenol and compounds represented by the formulas:

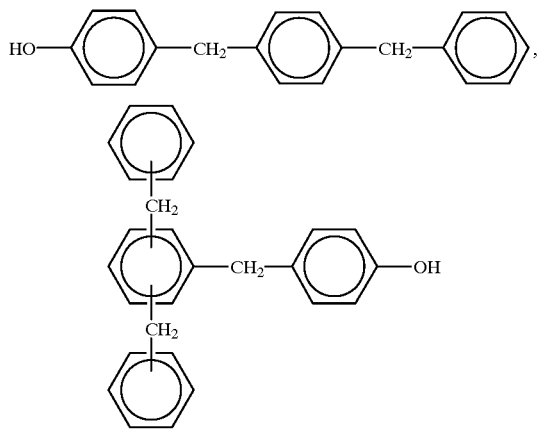

and, as chromane derivatives, for example, compounds represented by the formulas:

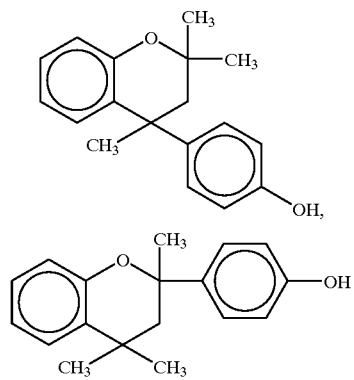

and the like.

Among such phenols, preferable are p-t-butylphenol, p-cumylphenol, p-phenylphenol and the like.

Also, compounds represented by the following formulas can be used:

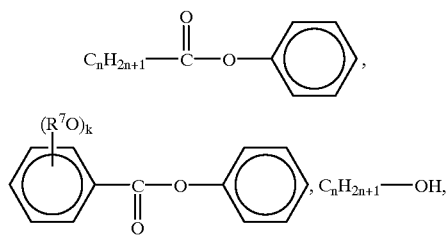

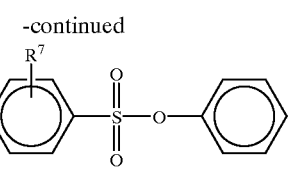

(In the formulas, n is an integer of 7 to 30.) (In the formulas, $R^7$ is an alkyl group having 1 to 7 carbon atoms and k is an integer of 1 to 3.).

The feeding of the swelling solvent gas or the mixed gas of the swelling solvent gas and the poor solvent gas may be effected by feeding the swelling solvent in the liquid state, or the swelling solvent and the poor solvent in the liquid state to a reactor and gasifying the same in the reactor. They may also be previously gasified by a heat exchanger or the like and thereafter fed to a reactor. Also, the feeding of the mixed gas of the swelling solvent gas and the poor solvent gas may be effected by feeding the swelling solvent and an inert gas to a reactor and then gasifying the swelling solvent in the reactor or by previously gasifying the swelling solvent, then mixing the same with the inert gas and thereafter feeding the mixed gas to a reactor. The swelling solvent gas or the mixed gas of the swelling solvent gas and the poor solvent gas and/or the inert gas may be allowed to flow, as far as it can be substituted for the atmospheric gas for the oligomer, in the vertical direction from the upper portion or from the bottom or in the horizontal direction. At least one opening for feeding the gas may be provided and it is possible to combine the flowing directions or limit the flowing sections.

The amount of the swelling solvent gas or the mixed gas of the swelling solvent gas and the poor solvent gas and/or the inert gas fed may be 0.001 to 500 cm/sec, preferably 0.01 to 200 cm/sec in terms of space linear velocity of the gas in the reactor. When the above space linear velocity exceeds 500 cm/sec, even if the particle diameter of the oligomer to be subjected to solid phase polymerization is adjusted to 10 cm by flaking, the oligomer in question becomes in the fluid state, and therefore, fluidization is caused in a fixed bed type reactor or the like and the plug flow properties become impossible to maintain. The flow rate of the swelling solvent gas or the mixed gas of the swelling solvent gas and the poor solvent gas and/or the inert gas has a close relation to the reaction rate and the gases act as a heating medium simultaneously with exhibiting an effect of removal of the phenols produced as by-products, so that the reaction rate increases as the flow rate of the gas increases. The temperature difference between the heat-transfer section such as jacket or the like and the internal powder can be diminished by the heating medium effect, and it is possible to prevent the fusion-bonding phenomenon or the like at the heat transfer section.

The reactor to be used in such a reaction is not critical. It is possible to use a conventional stirring vessel type reactor to a reactor of the tumbler type, the kiln type, the paddle dryer type, the screw conveyer type, the vibrating type, the fluidized bed type, the fixed bed type, the moving bed type or the like, and these can be used alone or in combination.

In the steps of drying and pelletizing a polycarbonate converted to have a high molecular weight, conventional methods can be used and there is no particular limit. When additives such as end-terminator, antioxidant and the like are mixed, it is possible to cover the flakes directly with the additives, spray liquid additives on the flakes or absorb gaseous additives into the flakes before or after the drying. Also, they can be mixed in an extruder in the pelletization. As the end-terminator, the above-mentioned ones can be used.

The antioxidants include specifically, in addition to tri (nonylphenyl)phosphite and 2-ethylhexyldiphenyl phosphite, trialkyl phosphites such as trimethyl phosphite, triethyl phosphite, tributyl phosphite, trioctyl phosphite, trinonyl phosphite, tridecyl phosphite, trioctadecyl phosphite, distearylpentaerythrityl diphosphite, tris(2-chloroethyl)phosphite, tris(2,3-dichloropropyl)phosphite and the like; tricycloalkyl phosphites such as tricyclohexyl phosphite and the like; triaryl phosphites such as triphenyl phosphite, tricresyl phosphite, tris(ethylphenyl)phosphite, tris(butylphenyl)phosphite, tris(nonylphenyl)phosphite, tris (hydroxyphenyl)phosphite and the like; trialkyl phosphates such as trimethyl phosphate, triethyl phosphate, tributyl phosphate, trioctyl phosphate, tridecyl phosphate, trioctadecyl phosphate, distearylpentaerythrityl diphosphate, tris(2-chloroethyl)phosphate, tris(2,3-dichloropropyl)phosphate and the like; tricycloalkyl phosphates such as tricyclohexyl phosphate and the like; triaryl phosphates such as triphenyl phosphate, tricresyl phosphate, tris(nonylphenyl)phosphate, 2-ethylphenyldiphenyl phosphate and the like; etc.

Next, the process II of this invention is explained.

As stated above, the process II of this invention is characterized by:

(C) using a polycarbonate oligomer as the starting material and (D) subjecting the polycarbonate oligomer to solid phase polymerization under a stream of a poor solvent gas (referred to hereinafter as the poor solvent solid phase polymerization in some cases).

First of all, (C) the polycarbonate oligomer which is the starting material is explained and then (D) the poor solvent solid phase polymerization is explained.

(C) Polycarbonate Oligomer

As the polycarbonate oligomer which is the starting material in the process II, there can be used those obtained in the same manner as in the case of the polycarbonate oligomer used in the process I of this invention already explained above.

However, the said polycarbonate oligomer has preferably a viscosity average molecular weight of about 1,500 to about 15,000, particularly preferably about 3,000 to about 10,000. When the molecular weight of the polycarbonate oligomer is low, the melting point becomes low, and it becomes necessary to lower the poor solvent solid phase polymerization temperature as discussed hereinafter, whereby the reaction rate becomes low. Also, when the molecular weight of the oligomer is low, at a low reaction temperature, the oligomer is wetted and the liquid content in the particles becomes high and the effect of use of the poor solvent becomes difficult to exhibit. Accordingly, it is necessary to use an oligomer having at least a melting point not lower than the boiling point of the solvent. For elevating the melting point of the oligomer, a treatment such as a heat treatment, an acetone treatment or the like may be effected.

The terminal ratio of the polycarbonate oligomer is, as in the process I, preferably such that the phenyl carbonate terminal:hydroxyl group terminal ratio=1:4 to 4:1. This is because when the terminal ratio is outside this range, the ultimate molecular weight of the polycarbonate finally obtained after the solid phase polymerization is limited, and it becomes difficult to allow the polymer to have the desired high molecular weight. The terminal ratio is particularly preferably in the range of from 1:1.5 to 1.5:1.

The above polycarbonate oligomer is preferably subjected to the poor solvent solid phase polymerization after flaking the same in the same manner as in the conventional solid phase polymerization. The flaking of the polycarbonate oligomer can be conducted in the known manner as in the process I. For example, a rolling granulation method, an extrusion granulation method, a compression granulation method, a melt granulation method, a spray-drying granulation method, a fluidized bed granulation method, a grinding granulation method, an agitation granulation method, a liquid phase granulation method, a vacuum-freezing granulation method or the like can be used. An agitation granulation method or the like in which the oligomer is dispersed in the poor solvent to be used in the solid phase polymerization and flaked is also effective.

The shape of the flake is not critical; however, the pellet shape, bead shape, granule shape and powder shape are preferred from the viewpoint of operability. Furthermore, an aggregate of fine particles and a porous product are preferable, and when the oligomer has been produced by the molten transesterification reaction, it is preferable to use the method of producing and aggregating the fine particles alone or in combination with the above-mentioned methods. The specific surface area of the particles is preferably 0.10 to 30 $m^2/g$ as in the process I. When the specific surface area is more than $30^2/g$, reduction of bulk density or the like is caused and such problems are caused that the effective volume of an equipment is required to be increased and the like.

The particle diameter of the flake affects the flow velocity of the poor solvent gas in the poor solvent solid phase polymerization, so that it is preferably in the range of from 10 microns to 10 cm, particularly preferably in the range of from 100 microns to 1 cm. When the particle diameter is too small, there is a possibility that the fine powder is entrained by the stream of the poor solvent gas to block the valves and pipings or adversely affect the solvent recovery step. When the particle diameter is too large, the diffusion distance of solvent is increased and the effect of the poor solvent is not obtained, so that a longer time becomes necessary for the reaction.

The flaking conditions may be varied depending upon the molecular weight of the oligomer, the granulation method, and, in a system in which a solvent is used, depending upon the kind and boiling point of the solvent used. However, if anything, the temperature is at least 20° C.

In the process II, such a crystallization operation as required in the conventional solid phase polymerization is not necessary, whereby a merit by simplification of the process is obtained.

(D) Poor Solvent Solid Phase Polymerization

This poor solvent solid phase polymerization is the nucleus of the process II, and consists of subjecting the above polycarbonate oligomer to solid phase polymerization under the flow of a poor solvent gas.

According to the poor solvent solid phase polymerization in the process II, the phenols produced as by-products are removed at a high efficiency by conducting the polymerization reaction under the flow of the poor solvent. As a result, the reaction rate is rapidly increased, so that it becomes possible to conduct the reaction at a lower temperature than the molten transesterification, and the quality of polycarbonate can be improved. Also, the reaction time can be greatly shortened as compared with not only the conventional solid phase polymerization method but also the molten transesterification method.

According to the poor solvent solid phase polymerization in the process II, the poor solvent has an effect of preventing the oligomer and its higher polymer from being fusion-bonded, so that the polymerization reaction can be conducted smoothly without causing the fusion-bonding.

In JP-A-1-158,033 disclosing the conventional solid phase polymerization method, it is stated that an inert gas such as nitrogen, argon, helium, carbon dioxide or the like or a lower hydrocarbon gas may be introduced into a reactor in the solid phase polymerization of a polycarbonate oligomer.

However, these gases have only the effect of lowering the partial pressure of the phenols produced as by-products in the gas phase of the reactor and cannot exhibit the remarkably effect brought about by the poor solvent gas used in the process II that the removal by distillation of the phenols produced as by-products is accelerated to increase rapidly the reaction rate.

The poor solvent is preferably such as to have a boiling point which enables the solvent to completely vaporize under the polymerization conditions or a vapor pressure of 50 mm Hg or more, preferably 200 mm Hg or more and such that the solubility of the polycarbonate oligomer or its higher polymer in the said solvent under the polymerization conditions is not more than 0.1% by weight. A solvent having a solubility parameter of 4 to 10 $(cal/cm^3)^{1/2}$, particularly 4 to 8 $(cal/cm^3)^{1/2}$ is preferred.

Here, it is difficult in the actual operation to confirm whether or not a certain solvent is the poor solvent for the polycarbonate oligomer or its higher polymer referred to in the process II, so that whether or not a solvent is the "poor solvent" referred to in the process II is indirectly judged by the following method.

First of all, a standard sample of polycarbonate, that is to say, a non-crystalline polycarbonate (glass transition point: 147–148° C.) having a viscosity average molecular weight of 22,000 and a crystallinity of 0.5% obtained by the interface polymerization method, is formed into pellets having a diameter of 2.5 mm and a length of 3.5 mm, and these pellets are placed together with a test solvent in an amount 1 to 20 times that of the pellets in a closable vessel and kept at 135° C. for two hours, and based on whether or not the solubility of the non-crystalline polycarbonate in the supernatant liquid at this time is not more than 0.1% by weight, it is judged whether or not the test solvent is the "poor solvent" referred to in the process II. In this case, the closable vessel may be any vessel and the atmosphere in the vessel when closed is mainly the vapor of the above solvent. The solubility is calculated from the weight change obtained by sampling the supernatant liquid into a glass tube or metal tube previously heated while the pressure of the is supernatant liquid is controlled and drying the solvent under a reduced pressure of approximately 110–200° C. depending upon the boiling point of the solvent.

As the above poor solvent, there are mentioned cyclic hydrocarbons having 5 to 20 carbon atoms, more preferably 5 to 10 carbon atoms; straight chain or branched chain saturated hydrocarbons having 4 to 18 carbon atoms, more preferably 6 to 12 carbon atoms; and lower unsaturated hydrocarbons having 4 to 18 carbon atoms, more preferably 6 to 12 carbon atoms. The poor solvents may be used alone or in admixture of two or more.

When the boiling point of the poor solvent exceeds 250° C., there is a possibility that the removal of the remaining solvent becomes difficult and the quality is deteriorated, so that the boiling point of the poor solvent is preferably not more than 250° C.

Incidentally, since solvents having a functional group whose hydrogen-bondability is relatively high such as a hydroxyl group, a carboxyl group, an amino group, an amido group, a cyano group, a nitro group, a sulfone group or the like have a possibility of participating in the transesterification reaction at a polymerization temperature which exceeds 150° C., said solvents should not be used. Moreover, from the viewpoint of environmental aspect, the use of a halogen-containing solvent is not desirable.

This poor solvent solid phase polymerization is preferably carried out at a temperature ranging from 100° C. to the melting point of the oligomer at a pressure of 10 Torr to 5 kg/cm²G. When the reaction temperature is as low as less than 100° C., the transesterification reaction does not proceed, while under such high temperature conditions that the reaction temperature exceeds the melting point of the oligomer, the solid state is difficult to maintain, such phenomena as fusion-bonding between particles and the like are caused and the running operation properties are remarkably deteriorated. The reaction temperature is particularly preferably 150 to 220° C. and the reaction pressure is particularly preferably atmospheric pressure. Incidentally, the above reaction temperature condition means the temperature of the oligomer measured at the inlet of the reactor and the above reaction pressure condition means the pressure measured at the gas outlet of the reactor.

As the polymerization catalyst in this poor solvent solid phase polymerization, the catalyst which has been added during the production of oligomer and remains may be used as it is; however, it is preferable to add the polymerization catalyst in the form of a powder, a liquid or a gas again during the solid phase polymerization, whereby the solid phase polymerization rate is further enhanced.

If necessary, an end-terminator can be added in the form of a powder, a liquid or a gas to conduct the poor solvent solid phase polymerization. Specific examples of the end-terminator include the same as mentioned in the explanation of the process I.

The feeding of the poor solvent gas may be effected by feeding the poor solvent in the liquid state to a reactor and vaporizing the same in the reactor, or by previously vaporizing the poor solvent by a heat exchanger or the like and thereafter feeding the same to a reactor. The flow of the poor solvent gas may be, as far as it can replace the atmospheric gas of the oligomer, in the vertical direction from the upper portion or from the bottom, or in the horizontal direction. At least one gas inlet may be provided depending upon the shape of the reactor and it is also possible to combine the flow directions or limit the flow sections.

The amount of the poor solvent gas fed may be 0.001 to 500 cm/sec, preferably 0.01 to 200 cm/sec in terms of the space linear velocity in the reactor. When the above space linear velocity exceeds 500 cm/sec, if the particle diameter of the oligomer to be subjected to solid phase polymerization is adjusted to 10 cm by flaking, the said oligomer becomes in the fluid state, so that fluidization is caused in a fixed bed type reactor or the like to make it impossible to maintain the plug flow properties. Since the flow rate of the poor solvent gas has a close relation to reaction rate and acts as a heat medium simultaneously with exhibiting the effect of removal of the phenols produced as by-products, the reaction rate increases as the flow rate of the gas increases. Also, the temperature difference between the heat transfer section and the internal powder can be diminished and it is possible to prevent the fusion-bonding phenomenon or the like in the heat transfer section.

The reactor used in such a reaction is not critical. It is possible to use from a conventional stirring tank type reactor to a reactor of the tumbler type, the kiln type, the paddle dryer type, the screw conveyer type, the vibrating type, the fluidized bed type, the fixed bed type, the moving bed type or the like. These can be used alone or in combination.

The steps of drying and pelletizing the polycarbonate having a high molecular weight can be effected in the conventional manner and there is no particular limit. When an additive such as an end-terminator, an antioxidant or the like is mixed, it is possible to directly cover the flakes with the additive powder, spray the additive liquid on the flakes or absorb the additive gas into the flakes. It is also possible to mix them in an extruder during the pelletization. As the end-terminator, those mentioned above are used. Also, as the antioxidant, there are specifically mentioned the same as exemplified in the explanation of the process I.

This invention is further explained by Examples below; however, this invention should not be construed to be limited to the Examples.

EXAMPLE 1

Production of Polycarbonate by Process I (1) Preparation of Polycarbonate Oligomer A 1-liter volume autoclave equipped with a stirrer, an inert gas-introducing tube and a phenol gas-discharging tube were charged with 2,283 g of bisphenol A, namely 2,2-bis(4-hydroxyphenyl)propane and 2,249 g of diphenyl carbonate, and vacuum deaeration and nitrogen-introduction were repeated, after which the contents were heated to 180° C. to completely melt the same. Vacuum deaeration and nitrogen-introduction were repeated again, and then 0.0025 mol of NaOH and 0.0001 mol of TMAH (tetramethylammonium hydroxide), which were catalysts, were added each in the form of an aqueous solution to start the reaction. Simultaneously with starting the reaction, the pressure was reduced to 100 mm Hg for removing the phenol produced as by-product out of the system, and the reaction was effected for 1.5 hours while the temperature was elevated to 240° C. Moreover, the temperature was elevated to 290° C. while the degree of vacuum was gradually lowered to 10 Torr and the reaction was effected for 1.5 hours. After completion of the reaction, nitrogen was introduced into the reactor to return the internal pressure to atmospheric pressure, and the contents were taken out little by little and dropped into water to be solidified. The thus solidified oligomer was ground by a crusher to obtain 2,430 g of a powder having an average particle diameter of 0.6 mm. The viscosity average molecular weight of this oligomer was 6,330. The proportions of the phenyl carbonate terminal and the hydroxyl group terminal were 53 mol % and 47 mol %, respectively, namely the phenyl carbonate terminal:hydroxyl group terminal ratio= 1.13:1.0.

(2) Production of High Molecular Weight Polycarbonate

The oligomer powder thus obtained was placed in an amount of 100 g in a burning tube having a diameter of 5 cm and a length of 30 cm previously heated to 220° C., and simultaneously therewith, toluene which was previously heated to 220° C. (swelling solvent, the solubility parameter=8.9 $(cal/cm^2)^{1/2}$) was fed at a velocity of 0.024 cm/sec (this means the space linear velocity in the reactor and applies hereinafter) in a proportion of 0.0049 liter (the normal state)/hr per g of the above oligomer powder to start the swollen solid phase polymerization. The reaction was continued for three hours while sampling with time. The results are shown in Table 1. The polymerization reaction was effected quickly and the viscosity average molecular weight of the polycarbonate obtained was 16,523 which was 2.61 times the viscosity average molecular weight of the oligomer. The polycarbonate sample obtained was melt-compressed and subjected to plate-molding to obtain a molded article which was not colored and was colorless and transparent.

EXAMPLE 2

Production of Polycarbonate by Process I

Basically the same procedure as in Example 1 was repeated, except that just before the swollen solid phase polymerization, NaOH was further added as a catalyst in a proportion of $1\times10^{-6}$ mol per the terminal hydroxyl group to effect the reaction. The results are shown in Table 1. Since the molecular weight of the polycarbonate obtained was 24,655, which was higher than the molecular weight of the polycarbonate in Example 1 (16,523), it can be seen that the reaction rate was increased by the addition of the catalyst. The polycarbonate sample obtained was melt-compressed and subjected to plate-molding to obtain a molded article which was not colored and was colorless and transparent.

EXAMPLE 3

Production of Polycarbonate by Process I

Basically the same procedure as in Example 1 was repeated, except that just before the swollen solid phase polymerization, TMAH was added as a catalyst in a proportion of $1\times10^{-6}$ mol per the terminal hydroxyl group, to effect the reaction. The results are shown in Table 1. The molecular weight of the polycarbonate obtained was 23,892, which was higher than the molecular weight (16,523) of the polycarbonate in Example 1. Therefore, it can be seen that by adding the catalyst, the reaction rate was enhanced. The polycarbonate sample obtained was melt-compressed and subjected to plate-molding to obtain a molded article which was not colored, and was colorless and transparent.

EXAMPLE 4

Production of Polycarbonate by Process I

Basically the same procedure as in Example 1 was repeated, except that a mixed solvent prepared by mixing 50% by weight of toluene as the swelling solvent with 50% by weight of heptane as the poor solvent was substituted for the swelling solvent, the mixed solvent gas feeding rate was adjusted to 0.042 cm/sec and the feeding amount thereof was adjusted to 0.0086 liter (the normal state)/hr per g of the oligomer powder, to effect the reaction. The results are shown in Table 1. By using the poor solvent together with the swelling solvent, a polycarbonate having a much higher molecular weight (32,680) than the molecular weight (16,523) of the polycarbonate obtained in Example 1 was obtained in a shorter time (2 hours) than the polymerization time (3 hours) in Example 1. When the polycarbonate obtained was powderized in the conventional manner to obtain a white powder which was not colored. The polycarbonate sample obtained was melt-compressed and subjected to plate-molding to obtain a molded article which was not colored, and was colorless and transparent.

EXAMPLE 5

Production of Polycarbonate by Process I

Basically the same procedure as in Example 1 was repeated, except that a mixed solvent prepared by mixing 25% by weight of toluene as the swelling solvent with 75% by weight of heptane as the poor solvent was substituted for the swelling solvent, the mixed solvent gas feeding rate was adjusted to 0.039 cm/sec and the feeding amount thereof was adjusted to 0.0080 liter (the normal state)/hr per g of the oligomer powder, to effect the reaction. The results are shown in Table 1. By using the poor solvent along with the swelling solvent, a polycarbonate having a molecular weight (36,920) much higher than the molecular weight (16,523) of the polycarbonate obtained in Example 1 was obtained in a shorter time (2 hours) than the polymerization time (3 hours) in Example 1 in which the poor solvent was not used. When the polycarbonate obtained was powderized in the conventional manner, a white powder was obtained and was not colored. The polycarbonate sample obtained was melt-compressed and subjected to plate-molding to obtain a molded article which was not colored, and was colorless and transparent.

EXAMPLE 6

Production of Polycarbonate by Process I

Basically the same procedure as in Example 1 was repeated, except that a mixed solvent prepared by mixing 5% by weight of toluene as the swelling solvent with 95% by weight of heptane as the poor solvent was substituted for the swelling solvent, the mixed solvent gas feeding rate was adjusted to 0.041 cm/sec and the feeding amount thereof was adjusted to 0.0083 liter (the normal state)/hr per g of the oligomer powder, to effect the reaction. The results are shown in Table 1. By using the poor solvent along with the swelling solvent, a polycarbonate having a molecular weight (34,231) much higher than the molecular weight (16,523) of the polycarbonate obtained in Example 1 was obtained in a shorter time (2 hours) than the polymerization time (3 hours) in Example 1. When the polycarbonate obtained was powderized in the conventional manner, a white powder was obtained and was not colored. The polycarbonate sample obtained was melt-compressed and subjected to plate-molding to obtain a molded article which was not colored, and was colorless and transparent.

EXAMPLE 7

Production of Polycarbonate by Process I

Basically the same procedure as in Example 4 was repeated, except that the feeding rate of a mixed solvent gas prepared by 50% by weight of toluene (the swelling solvent) previously heated to 220° C. with 50% by weight of heptane (the poor solvent) previously heated to 220° C. was lowered from 0.042 cm/sec to 0.0016 cm/sec and the amount of the mixed solvent gas fed was lowered to 0.0004 liter (the normal state)/hr per g of the oligomer powder, to effect the reaction. The results are shown in Table 1. By lowering the feeding rate of the solvent gas, the molecular weight of the polycarbonate obtained became 22,725 which was lower than the molecular weight (32,680) of the polycarbonate of Example 4 but much higher than the molecular weight (16,523) of the polycarbonate of Example 1. By powderizing in the conventional manner, a white powder was obtained and no coloration was found. A molded article obtained by melt-compressing and plate-molding was not colored and was colorless and transparent.

EXAMPLE 8

Production of Polycarbonate by Process I

Basically the same procedure as in Example 4 was repeated, except that the feeding rate of the mixed solvent gas prepared by mixing 50% by weight of toluene previously heated to 220° C. with 50% by weight of heptane previously heated to 220° C. was elevated from 0.042 cm/sec to 0.540 cm/sec and the amount of the mixed solvent gas fed was increased to 0.11 liter (the normal state)/hr per g of the oligomer, to effect the reaction. The results are shown in Table 1. By elevating the feeding rate of the solvent gas, the molecular weight of the polycarbonate obtained became 42,330 which was higher than the molecular weight (32,680) of the polycarbonate of Example 4. By powderized in the conventional manner, a white powder was obtained and no coloration was found. A molded article obtained by melt-compressing and plate-molding was not colored and was colorless and transparent.

EXAMPLE 9

Production of Polycarbonate by Process I

Basically the same procedure as in Example 4 was repeated, except that xylene/heptane (50/50 w/w) was substituted for the toluene/heptane (50/50 w/w) as the mixed solvent. Incidentally, the solubility parameter of xylene was 8.8 $(cal/cm^3)^{1/2}$. The results are shown in Table 1. By using xylene as the swelling solvent, the molecular weight of the polycarbonate was increased to 51,230 which was 1.57 times the molecular weight (32,680) of the polycarbonate of Example 4. A powder obtained in the conventional manner was white, and no undesirable coloration was found. A molded article obtained by melt-compressing and plate-molding was not colored and was colorless and transparent.

EXAMPLE 10

Production of Polycarbonate by Process I

Basically the same procedure as in Example 9 was repeated, except that the reaction temperature was lowered from 220° C. to 200° C. The results are shown in Table 1. By lowering the reaction temperature, the molecular weight of the polycarbonate became 44,600 which was lower than the molecular weight (51,230) of the polycarbonate of Example 9, but much higher than the molecular weight (16,523) of the polycarbonate of Example 1. The properties of a powder and a molded article obtained in the conventional manner were good as in Example 9.

EXAMPLE 11

Production of Polycarbonate by Process I

Basically the same procedure as in Example 9 was repeated, except that the reaction temperature was lowered from 220° C. to 190° C. The results are shown in Table 1. By lowering the reaction temperature, the molecular weight of the polycarbonate obtained became 31,252, which was lower than the molecular weight of the polycarbonate (51,230) in Example 9 but much higher than the molecular weight (16,523) of the polycarbonate in Example 1. The properties of a powder and a molded article obtained in the conventional manner were good as in Example 9.

EXAMPLE 12

Production of Polycarbonate by Process I

By the conventional interface polymerization method, 420 g of an oligomer 100% terminated with phenyl carbonate (Mv: 8,700) and 420 g of an oligomer 100% terminated with a hydroxyl group (Mv: 3,240) were prepared. These were mixed so that the phenyl carbonate terminal:hydroxyl group terminal ratio became 53 mol %:47 mol % (1.13:1.0), dissolved in methylene chloride and precipitated from heptane to obtain a white oligomer powder. The viscosity average molecular weight was 7,290.

To 100 g of this oligomer powder was added NaOH in an amount of $1 \times 10^{-6}$ mol per the hydroxyl group terminal and they were mixed so that the powder was uniformly covered with NaOH, and thereafter, the mixture was subjected to swollen solid phase polymerization in the same manner as in Example 9. The results are shown in Table 1. Even when the oligomer obtained by the interface polymerization method was used, a polycarbonate having as very high a molecular weight as 52,300 was obtained. The properties of a powder and a molded article obtained in the conventional manner were good as in Example 9.

EXAMPLE 13

Production of Polycarbonate by Process I

The same oligomer as used in Example 12 was used and 100 g of this oligomer powder was sprayed with an aqueous solution of TMAH in an amount of $1 \times 10^{-5}$ mol per the hydroxyl group terminal, after which they were subjected to swollen solid phase polymerization in the same manner as in Example 9. The results are shown in Table 1. Even when an oligomer obtained by the interface polymerization method was used, a polycarbonate having as very high a molecular weight as 47,860 was obtained. The properties of a powder and a molded article obtained in the conventional manner were good as in Example 9.

Comparative Example 1

Conventional Molten Transesterification Method

In a 500-ml autoclave was placed 100 g of the oligomer prepared in Example 1 (1), melted at 280° C., and thereafter subjected to reaction with sufficient stirring at a pressure of 0.1 Torr for three hours while the temperature was elevated to 290° C. The results are shown in Table 1. Although in Examples 1 to 13, the polycarbonate was little colored, in this molten transesterification reaction, the polycarbonate was considerably colored though sufficient nitrogen substitution was conducted.

Comparative Example 2

Conventional Solid Phase Polymerization Method

In a burning tube having a diameter of 5 cm and a length of 30 cm previously heated to 220° C. was placed 100 g of the oligomer prepared in Example 1 (1), simultaneously with which nitrogen previously heated to 220° C. was fed at a velocity of 0.038 cm/sec, and solid phase polymerization was conducted under an inert gas stream. The results are shown in Table 1. As compared with Examples 1 to 13 in which the swollen solid phase polymerization method was conducted, the reaction rate was low, and the molecular weight of the polycarbonate obtained in a polymerization time of three hours was as very low as 8,871. Accordingly, it can be seen that for obtaining a polycarbonate having a high molecular weight, a considerably long period of time is required.

Comparative Example 3

Conventional Solid Phase Polymerization Method

Using acetone, 100 g of the oligomer prepared in Example 1 (1) was crystallization-treated at room temperature for 12 hours, and then vacuum dried at 100° C. for two hours. Thereafter, this crystallized oligomer was placed in a burning tube having a diameter of 5 cm and a length of 30 cm heated to 220° C., simultaneously with which it was subjected to solid phase polymerization while an acetone gas previously heated to 220° C. was fed at a velocity of 0.043 cm/sec. The results are shown in Table 1. As compared with Examples 1 to 13 in which the swollen solid phase polymerization was conducted, the reaction rate was low and the molecular weight of a polycarbonate obtained in a polymerization time of three hours was as very low as 7,213. Accordingly, it can be seen that for obtaining a high molecular weight polycarbonate, a considerably long period of time is required.

TABLE 1

| | | Oligomer | |
|---|---|---|---|
| | Oligomer production method | Mv (–) | Crystallinity |
| Example 1 | Melting method | 6330 | 3.7% |
| Example 2 | Melting method | 6330 | 3.7% |
| Example 3 | Melting method | 6330 | 3.7% |
| Example 4 | Melting method | 6330 | 3.7% |
| Example 5 | Melting method | 6330 | 3.7% |
| Example 6 | Melting method | 6330 | 3.7% |
| Example 7 | Melting method | 6330 | 3.7% |
| Example 8 | Melting method | 6330 | 3.7% |
| Example 9 | Melting method | 6330 | 3.7% |
| Example 10 | Melting method | 6330 | 3.7% |
| Example 11 | Melting method | 6330 | 3.7% |
| Example 12 | Interface method | 7290 | 30.2% |
| Example 13 | Interface method | 7290 | 30.2% |
| Comp. Ex. 1 | Melting method | 6330 | 0% |
| Comp. Ex. 2 | Melting method | 6330 | 3.7% |
| Comp. Ex. 3 | Melting method | 6330 | 24.7% |

| | | | Reaction conditions | |
|---|---|---|---|---|
| | Oligomer polymerization stye | Catalyst | Temperature (° C.) | Pressure (Torr) |
| Example 1 | Swollen solid phase polymerization method | | 220 | atm. |
| Example 2 | Same as above | NaOH | 220 | atm. |
| Example 3 | Same as above | TMAH | 220 | atm. |
| Example 4 | Same as above | | 220 | atm. |
| Example 5 | Same as above | | 220 | atm. |
| Example 6 | Same as above | | 220 | atm. |
| Example 7 | Same as above | | 220 | atm. |
| Example 8 | Same as above | | 220 | atm. |
| Example 9 | Same as above | | 220 | atm. |
| Example 10 | Same as above | | 220 | atm. |
| Example 11 | Same as above | | 190 | atm. |
| Example 12 | Same as above | NaOH | 220 | atm. |
| Example 13 | Same as above | TMAH | 220 | atm. |
| Comp. Ex. 1 | Conventional melting method | | 290 | 0.1 |
| Comp. Ex. 2 | Conventional solid phase polymerization method | | 220 | atm. |
| Comp. Ex. 3 | Same as above | | 220 | atm. |

| | solvent gas Solvent | Amount of solvent gas fed (cm/sec) | Polymerization time (hrs) |
|---|---|---|---|
| Example 1 | Toluene | 0.024 | 3 |
| Example 2 | Toluene | 0.023 | 3 |
| Example 3 | Toluene | 0.024 | 3 |
| Example 4 | Toluene/heptane 50/50 w/w | 0.042 | 2 |
| Example 5 | Toluene/heptane 25/75 w/w | 0.039 | 2 |
| Example 6 | Toluene/heptane 5/95 w/w | 0.041 | 2 |
| Example 7 | Toluene/heptane 50/50 w/w | 0.0016 | 2 |
| Example 8 | Toluene/heptane 50/50 w/w | 0.540 | 2 |
| Example 9 | Xylene/heptane 50/50 w/w | 0.057 | 2 |
| Example 10 | Xylene/heptane 50/50 w/w | 0.049 | 2 |

TABLE 1-continued

| Example 11 | Xylene/heptane 50/50 w/w | 0.052 | 2 |
|---|---|---|---|
| Example 12 | Xylene/heptane 50/50 w/w | 0.063 | 2 |
| Example 13 | Xylene/heptane 50/50 w/w | 0.059 | 2 |
| Comp. Ex. 1 | — | — | 3 |
| Comp. Ex. 2 | Nitrogen (inert gas) | 0.038 | 3 |
| Comp. Ex. 3 | Acetone | 0.043 | 3 |

|  | Mv(−) after polymerization | Remarks |
|---|---|---|
| Example 1 | 16,523 | Slightly fusion-bonded |
| Example 2 | 24,655 | Slightly fusion-bonded |
| Example 3 | 23,892 | Slightly fusion-bonded |
| Example 4 | 32,680 | White powder, not colored |
| Example 5 | 36,920 | White powder, not colored |
| Example 6 | 34,231 | White powder, not colored |
| Example 7 | 22,725 | White powder, not colored |
| Example 8 | 42,330 | White powder, not colored |
| Example 9 | 51,230 | White powder, not colored |
| Example 10 | 44,600 | White powder, not colored |
| Example 11 | 31,252 | White powder, not colored |
| Example 12 | 52,300 | White powder, not colored |
| Example 13 | 47,860 | White powder, not colored |
| Comp. Ex. 1 | 34,510 | Colored (brown) |
| Comp. Ex. 2 | 8,871 | White powder, not colored |
| Comp. Ex. 3 | 7,213 | White powder, not colored |

EXAMPLE 14

Production of Polycarbonate by Process I (1) Preparation of Polycarbonate Oligomer In a 1-liter volume autoclave equipped with a stirrer, an inert gas-introducing tube and a phenol gas-discharging tube were placed 2,283 g of bisphenol A, namely 2,2-bis(4-hydroxyphenyl)propane and 2,249 g of diphenyl carbonate, and vacuum deaeration and nitrogen introduction were repeated, after which the contents were heated to 180° C. to be completely melted. Vacuum deaeration and nitrogen introduction were conducted again and thereafter, NAOH and TMAH (tetramethylammonium hydroxide) which were catalysts were added in aqueous solution in amounts of 0.0025 mol and 0.0001 mol, respectively, to start reaction. Simultaneously with the start of the reaction, the pressure was reduced to 100 mm Hg for removing the phenol produced as by-product out of the system, and the reaction was effected for 1.1 hours while the temperature was elevated to 220° C. Moreover, the temperature was elevated to 260° C. while the degree of vacuum was gradually lowered to 10 Torr, and the reaction was effected for 1.5 hours. After completion of the reaction, the internal pressure of the reactor was returned to atmospheric pressure with nitrogen, and the contents were taken out little by little and dropped into water to be solidified. This solidified oligomer was ground by a crusher to obtain 2,380 g of a powder having an average particle diameter of 0.24 mm. The viscosity average molecular weight of this oligomer was 5,660. The proportions of the phenyl carbonate terminal and the hydroxyl group terminal of the oligomer were 53 mol % and 47 mol %, respectively, and the phenyl carbonate terminal-:hydroxyl group terminal ratio=1.13:1.0.

(2) Production of High Molecular Weight Polycarbonate

In a 500-ml glass autoclave (having a stirrer set at 130 rpm) heated to 210° C. was placed 100 g of the oligomer powder thus obtained, and simultaneously therewith, a mixed gas of toluene (swelling solvent) gas and nitrogen (inert gas) in a volume ratio of 50/50 (vol./vol.) under the reaction temperature condition, the mixed gas having been previously heated to 210° C., was fed at a velocity of 0.077 cm/sec in a proportion of 0.083 liter (the normal state)/hr per g of the above oligomer powder to start swollen solid phase polymerization. The reaction was conducted for two hours while sampling was effected with time. The results are shown in Table 2. By using the inert gas along with the swelling solvent gas, there was obtained a polycarbonate having a much higher molecular weight (29,600) than the molecular weight (16,523) of the oligomer obtained in Example 1, in which no inert gas was used, in a shorter time (2 hours) than the polymerization time (3 hours) in Example 1. The polycarbonate sample obtained was melt-compressed and subjected to plate-molding to obtain a molded article which was not colored, and was colorless and transparent.

EXAMPLE 15

Production of Polycarbonate by Process I

In an Erlenmeyer flask equipped with a 1-liter reflux tube, 500 g of the oligomer powder prepared in Example 14 (1) was melted again at 250° C. under a nitrogen atmosphere, simultaneously with which 130 g of p-xylene was mixed therewith to prepare a solution. A half of the solution was dropped into water to obtain spherical oligomer flakes having an average particle diameter of 1.4 mm, a crystallinity of 31.8% and a melting point of 226.2° C. 100 g thereof was placed in an SUS fixed bed type reactor having a diameter of 5 cm and a length of 30 cm and subjected to reaction for increasing molecular weight at 220° C. for two hours using, as a swelling solvent mixed gas, a mixed gas of p-xylene (swelling solvent, solubility parameter: 8.8 (cal/cm$^3$)$^{1/2}$) and carbon dioxide (inert gas) in a volume ratio of 28/72 (vol./vol.) under the reaction conditions at the same gas flow velocity and in the same feeding proportion as in Example 14. The results are shown in Table 2. From Table 2, the molecular weight of the polycarbonate obtained was 31,200. The polycarbonate sample obtained was melt-compressed and subjected to plate-molding to obtain a molded article which was not colored, and was colorless and transparent.

EXAMPLE 16

Production of Polycarbonate by Process I

The same procedure as in Example 15 was repeated, except that 100 g of the oligomer flakes prepared in Example 15 were used and a mixed gas of p-xylene and nitrogen at a volume ratio of 52/48 (vol./vol.) under the reaction temperature condition was used as the swelling solvent mixed gas and the reaction was conducted in a horizontal agitating vessel (500 ml) equipped with a paddle blade. The results are shown in Table 2. From Table 2, the molecular weight of the polycarbonate obtained was 27,500. The polycarbonate sample obtained was melt-compressed and subjected to plate-molding to obtain a molded article which was not colored, and was colorless and transparent.

EXAMPLE 17

Production of Polycarbonate by Process I 300 g of the oligomer solution in p-xylene prepared in Example 15 was sucked into a Teflon-lined SUS tube having an inner diameter of 2 mm, cooled to room temperature, and then extruded and simultaneously cut to a length of 3 mm, thereby preparing 230 g of pellets in which fine precipitated particles were aggregated (melting point: 226° C., crystallinity: 28.9%, specific surface area: 5.2 m$^2$/g). 100 g thereof was passed through a mixed gas atmosphere consisting of p-xylene and helium at a volume ratio of 50/50 (vol./vol.) under the reaction temperature condition to be subjected to reaction for increasing molecular weight under the same conditions as in Example 15 for two hours. The results are shown in Table 2. From Table 2, the polycarbonate sample obtained was melt-compressed and subjected to plate-molding to obtain a molded article which was not colored, and was colorless and transparent.

EXAMPLE 18

Production of Polycarbonate by Process I

Under the same conditions as in Example 15, 100 g of the oligomer pellets prepared in Example 17 were subjected to reaction for increasing molecular weight for two hours using, as the swelling solvent mixed gas, a mixed gas consisting of mesitylene and nitrogen at a volume ratio of 46/54 (vol./vol.) under the reaction temperature condition. The results are shown in Table 2. The molecular weight of the polycarbonate obtained was 37,820. The polycarbonate sample obtained was melt-compressed and subjected to plate-molding to obtain a molded article which was not colored, and was colorless and transparent.

EXAMPLE 19

Production of Polycarbonate by Process I 500 g of the oligomer powder prepared in Example 14 was allowed to reside at 250° C. for six minutes to be melted, and then extruded into strands having a diameter of 2 mm which were then cooled and cut to a length of 3 mm. The pellets obtained were immersed in acetone for 30 minutes to be crystallized and thereafter dried under a nitrogen stream at 110° C. The crystallized pellets obtained had a crystallinity of 24.1% and a melting point of 223.5° C. This was subjected to reaction for increasing molecular weight under the same conditions as in Example 15 for two hours using, as a swelling solvent mixed gas, a mixed gas of p-xylene and nitrogen at a volume ratio of 46/54 (vol./vol.) under the reaction temperature condition. The results are shown in Table 2. The molecular weight of the polycarbonate obtained was 24,600. The polycarbonate sample obtained was melt-compressed and subjected to plate-molding to obtain a molded article which was not colored, and was colorless and transparent.

Comparative Example 4

Molten Transesterification Method

A polycarbonate was obtained not by the swollen solid phase polymerization method of the process I but by the molten transesterification method. That is to say, 100 g of the oligomer prepared in Example 13 was placed in a 500-ml autoclave and melted at 260° C., and thereafter subjected to reaction at a pressure of 0.6 Torr with sufficient stirring for two hours while the temperature was elevated to 290° C. In the above Examples 14 to 19, substantially no coloration of polycarbonate was found, but in the case of the molten transesterification reaction of the present Comparative Example, the polycarbonate was considerably colored in spite of a sufficient nitrogen substitution. The reaction results are shown in Table 2. The molecular weight of the polycarbonate obtained was 24,700 and the reaction rate was close to the value in the swollen solid phase polymerization method of the process I.

Comparative Example 5

Conventional Solid Phase Polymerization Method

Solid phase polymerization was conducted using only an inert gas without using any swelling solvent gas. That is to say, 100 g of the oligomer prepared in Example 18 was placed in a burning tube having a diameter of 5 cm and a length of 30 cm heated to 220° C., simultaneously with which nitrogen previously heated to 220° C. was fed at a velocity of $9.2 \times 10^{-2}$ cm/sec, and solid phase polymerization under an inert gas atmosphere was conducted for 12 hours. The results are shown in Table 2. The molecular weight of the polycarbonate obtained was 20,800. It is seen that in the solid phase polymerization method of the present Comparative Example, the reaction rate is slow and a considerably long period of time is required as compared with the swollen solid phase polymerization method of the process I.

TABLE 2

| | Properties of oligomer | | | | |
|---|---|---|---|---|---|
| | Molecular weight (Mv) | Terminal ratio (phenol/—OH) | Crystallinity (%) | Melting point (° C.) | Shape of oligomer |
| Example 14 | 5980 | 53/47 | 0.5 | 126 | Ground particle |
| Example 15 | 5980 | 53/47 | 31.8 | 226.2 | Spherical |
| Example 16 | 5980 | 53/47 | 31.8 | 226.2 | Spherical |
| Example 17 | 5980 | 53/47 | 28.9 | 226 | Pellet |
| Example 18 | 5980 | 53/47 | 28.9 | 226 | Pellet |
| Example 19 | 5980 | 53/47 | 24.1 | 223.5 | Pellet |
| Comp. Ex. 4 | 5980 | 53/47 | — | — | — |
| Comp. Ex. 5 | 5980 | 53/47 | 29.8 | 223.5 | Spherical |

| | Polymerization step | | | |
|---|---|---|---|---|
| | Shape of polymerizer | Reaction temp. (° C.) | Swelling solvent | Inert gas |
| Example 14 | | | | |
| Example 15 | Upright stirring vessel | 210 | Toluene | Nitrogen |
| Example 16 | Fixed bed | 220 | p-Xylene | Carbon dioxide |
| Example 17 | Fixed bed | 220 | p-Xylene | Nitrogen |
| Example 18 | Horizontal stirring vessel | 220 | p-Xylene | Helium |
| Example 19 | Fixed bed | 220 | Mesitylene | Nitrogen |
| Comp. Ex. 4 | Fixed bed | 220 | p-Xylene | Nitrogen |
| Comp. Ex. 5 | Upright stirring vessel | 260–290 | — | — |
| Comp. Ex. 6 | Fixed bed | 220 | — | Nitrogen |

| | Polymerization step | | Ultimate molecular |
|---|---|---|---|
| | Inert gas (vol %) | Reaction time (hr) | weight of polycarbonate (Mv) |
| Example 14 | 50 | 2 | 29,600 |
| Example 15 | 72 | 2 | 31,200 |
| Example 16 | 48 | 2 | 27,500 |
| Example 17 | 50 | 2 | 33,400 |
| Example 18 | 54 | 2 | 37,820 |
| Example 19 | 54 | 2 | 24,600 |
| Comp. Ex. 4 | — | 2 | 24,700 |
| Comp. Ex. 5 | 100 | 12 | 20.800 |

EXAMPLE 20

Production of Polycarbonate by Process I (1) Preparation of Chloroformate Terminated Oligomer In a flask having an inner volume of 20 liters equipped with a stirrer were placed 910 g of bisphenol A, namely 2,2-bis(4-hydroxyphenyl)propane and 5.6 liters of 2 N aqueous sodium hydroxide solution, and they were stirred under a nitrogen stream to prepare an aqueous sodium hydroxide solution of bisphenol A. To this solution was added 3.3 liters of methylene chloride, and the mixture was stirred with cooling in a water bath, after which phosgene was blown thereinto for 90 minutes.

The reaction mixture obtained was allowed to stand at room temperature, upon which a methylene chloride solution of the chloroformate-terminated oligomer separated as the lower layer and was obtained. This methylene chloride solution of the chloroformate-terminated oligomer had an oligomer concentration of 320 g/liter, an average degree of polymerization of 2.99 and a chloroformate group concentration of 0.7 N.

(2) Preparation of Prepolymer for Reaction for Increasing Molecular Weight

One liter of the reaction mixture of the chloroformate-terminated oligomer obtained in (1) above was transferred to a 5-liter vessel equipped with a stirrer, and therein were placed an aqueous sodium hydroxide solution of phenol (3.6 g of phenol, 1.9 g of sodium hydroxide and 23.4 g of water) and 0.88 g of tetraethylamine, after which the mixture was stirred for 30 minutes.

Subsequently, to this reaction mixture were added an aqueous sodium hydroxide solution of bisphenol A (63.9 g of bisphenol A, 42.2 g of sodium hydroxide and 0.35 liter of water) and 0.6 liter of methylene chloride, and the mixture was stirred for 30 minutes.

The reaction mixture thus obtained was separated into an aqueous phase and a methylene chloride phase containing the prepolymer produced, and the methylene chloride phase was recovered. This methylene chloride phase recovered was washed successively with 0.1 N aqueous sodium hydroxide solution, 0.1 N aqueous hydrochloric acid solution and pure water.

Subsequently, to this methylene chloride solution of prepolymer was added the same volume of n-heptane, and the solvent was removed by distillation with heat-stirring at 70° C., to obtain a white powder having an average particle diameter of 0.13 mm. The terminal group composition of this powder was measured by NMR to find that the phenyl group terminal was 52 mol % and the hydroxyl group terminal was 48 mol %. The viscosity average molecular weight was 6,470 and the degree of polymerization was 11.

(3) Production of High Molecular Weight Polycarbonate by the Swollen Solid Phase Polymerization of Prepolymer 100 g of the prepolymer powder obtained in (2) above was placed in a 500-ml glass autoclave equipped with a stirrer (set at 130 rpm) heated to 220° C., simultaneously with which a mixed gas consisting of toluene (swelling solvent) and nitrogen gas (inert gas) at a volume ratio of 50/50 (vol./vol.) at the reaction temperature, said mixed gas having previously been heated to 220° C., was fed at a velocity of 2.5 cm/sec in a proportion of 2.73 liter (the normal state)/hr per g of the above prepolymer, and the mixture was subjected to the swollen solid phase polymerization for two hours. The results are shown in Table 3. The polycarbonate powder after the polymerization had a viscosity average molecular weight of 42,600. The polycarbonate powder obtained was melt-compressed and subjected to plate-molding to obtain a molded article which was not colored, and was colorless and transparent.

EXAMPLE 21

Production of Polycarbonate by Process I 1.0 Liter of the washed methylene chloride solution of prepolymer prepared in Example 20 (2) was concentrated with stirring on a hot water bath at 80° C. to obtain white flakes. 400 g of the flakes were placed in a 1-liter Erlenmeyer flask equipped with a reflux tube and then 400 g of p-xylene was added thereto, after which the flask was placed in an oil bath at 250° C. to prepare a solution. A half of the solution was dropped into water at 40° C. to obtain 193 g of spherical particles having an average particle diameter of 0.48 mm.

100 g of the particles were placed in an SUS fixed bed type reactor having a diameter of 5 cm and a length of 30 cm, and a mixed gas consisting of a p-xylene (swelling solvent) gas and a n-heptane (poor solvent) gas at a volume ratio of 50/50 (vol./vol.) was fed as the swelling solvent mixed gas at a velocity of 3.4 cm/sec in a proportion of 3.72 liters (the normal state)/hr per g of the above particles, after which the mixture was subjected to the swollen solid phase polymerization at 220° C. for two hours. The results are shown in Table 3.

The polycarbonate powder after the polymerization had a viscosity average molecular weight of 38,200. The sample obtained was melt-compressed and subjected to plate-molding to obtain a molded article which was not colored, and was colorless and transparent. The steam resistance was equivalent to the product of the interface polymerization and hence excellent. After completion of the reaction, fusion-bonding and the like were not found and the recovery from the reactor was easy.

EXAMPLE 22

Production of Polycarbonate by Process I 300 g of a p-xylene solution of the prepolymer prepared in Example 21 was sucked into a Teflon-lined SUS tube having an inner diameter of 2 mm, cooled to room temperature and thereafter extruded and simultaneously cut to a length of 3 mm, to produce pellets in which very fine precipitated particles were aggregated. Using the pellets, the swollen solid phase polymerization was conducted in the same manner as in Example 21. The results are shown in Table 3.

The polycarbonate powder after the polymerization had a viscosity average molecular weight of 34,800. The sample obtained was melt-compressed and subjected to plate-molding to obtain a molded article which was not colored, and was colorless and transparent and excellent. After completion of the reaction, fusion-bonding and the like were not found and the recovery from the reactor was easy.

EXAMPLE 23

Production of Polycarbonate by Process I (1) Preparation of Prepolymer for Reaction for Increasing Molecular Weight One liter of the reaction mixture of the chloroformate-terminated oligomer obtained in Example 20 (1) was transferred to a 5-liter vessel equipped with a stirrer, and an aqueous sodium hydroxide solution of phenol (3.6 g of phenol, 1.9 g of sodium hydroxide and 23.4 g of water) and 0.88 g of tetraethylamine were placed therein, and further an aqueous sodium hydroxide solution of bisphenol A (63.9 g of bisphenol A, 42.2 g of sodium hydroxide and 0.35 liter of water) and 0.6 liter of methylene chloride were added thereto, after which the mixture was stirred for 45 minutes.

The reaction mixture thus obtained was separated into an aqueous phase and a methylene chloride phase containing the prepolymer produced, and the methylene chloride phase was recovered. The methylene chloride phase recovered was washed successively with 0.1 N aqueous sodium hydroxide solution, 0.1 N aqueous hydrochloric acid solution and pure water.

Subsequently, to this methylene chloride solution of the prepolymer was added the same volume of n-heptane and the solvent was removed by distillation at 70° C. with heat-stirring to obtain a white powder having an average particle diameter of 0.12 mm. This powder was subjected to measurement of terminal group composition by NMR to find that the phenyl group terminal was 46 mol % and the hydroxyl group terminal was 54 mol %. The viscosity average molecular weight was 6,990 and the degree of polymerization was 12.

(2) Production of High Molecular Weight Polycarbonate by Swollen Solid Phase Polymerization In the same manner as in Example 20, 100 g of the prepolymer powder obtained in (1) above was subjected to reaction for increasing molecular weight to obtain a polycarbonate. The results are shown in Table 3. The polycarbonate powder after the polymerization had a viscosity average molecular weight of 39,700 and the powder obtained was melt-compressed and subjected to plate-molding to obtain a molded article which was not colored, and was colorless and transparent. After completion of the reaction, some spongy organs were found but no problem was found in the recovery from the reactor.

TABLE 3

|  |  | Ex. 20 | Ex. 21 | Ex. 22 | Ex. 23 |
|---|---|---|---|---|---|
| Oligomer production process | | Interface method | Interface method | Interface method | Interface method |
| Oligomer Mv(-) | | 6,470 | 6,470 | 6,440 | 6,990 |
| Oligomer terminal ratio (phenyl/—OH) | | 52/48 | 52/48 | 52/48 | 46/54 |
| Oligomer crystallinity | | 29.8% | 30.0% | 29.6% | 29.8% |
| Oligomer shape | | Powder | Spherical particle | Pellet | Powder |
| Oligomer polymerization system | | Swollen solid phase | Swollen solid phase | Swollen solid phase | Swollen solid phase |
| Reaction conditions | Temp. (° C.) | 220 | 220 | 220 | 220 |
| | Pressure (Torr) | Atmospheric | Atmospheric | Atmospheric | Atmospheric |
| Mixed gas (vol./vol.) | | Toluene/ nitrogen (50/50) | p-Xylene/ n-heptane (50/50) | p-Xylene/ n-heptane (50/50) | p-Xylene/ n-heptane (50/50) |
| Amount of mixed gas fed (cm/sec) | | 2.5 | 3.4 | 3.4 | 3.4 |
| Polymerization time (hr) | | 2 | 2 | 2 | 2 |
| Mv(-) after polymerization | | 42,600 | 38,200 | 34,800 | 39,700 |

EXAMPLE 24

Production of Polycarbonate by Process II (1) Preparation of Polycarbonate Oligomer In the same manner as in Example 1, 2,430 g of a polycarbonate oligomer having an average particle diameter of 0.6 mm was obtained. The viscosity average molecular weight of this oligomer was 6,330. The proportions of the phenyl carbonate terminal and the hydroxyl group terminal of the oligomer were 53 mol % and 47 mol %, respectively, and the phenyl carbonate terminal:hydroxyl group terminal ratio=1.13:1.0.

(2) Production of High Molecular Weight Polycarbonate

In a burning tube having a diameter of 5 cm and a length of 30 cm heated to 220° C. was placed 100 g of the oligomer powder thus obtained, simultaneously with which n-heptane (poor solvent, solubility parameter: 7.4 $(cal/cm^3)^{1/2}$) previously heated to 220° C. was fed at a velocity of 0.031 cm/sec (space linear velocity in the reactor is meant thereby and the same applies hereinafter) in a proportion of 0.0064 liter (the normal state)/hr per g of the above oligomer powder, to state the poor solvent solid phase polymerization. The reaction was effected for one hour while sampling with time. The results are shown in Table 4. The polymerization reaction was effected rapidly and the viscosity average molecular weight of the polycarbonate obtained was 22,540, which was 3.56 times the viscosity average molecular weight of the oligomer. The polycarbonate obtained was powderized in the conventional manner to obtain a white powder and no undesirable coloration was found. The polycarbonate sample was melt-compressed and subjected to plate-molding to obtain a molded article which was not colored, and was colorless and transparent.

EXAMPLE 25

Production of Polycarbonate by Process II

Basically the same procedure as in Example 24 was repeated, except that just before the poor solvent solid phase polymerization, NaOH was added as a catalyst in a proportion of $1 \times 10^{-6}$ mol per the terminal hydroxyl group, to effect the reaction. The results are shown in Table 4. Since even when the polymerization time was adjusted to 0.5 hour which was ½ of the reaction time in Example 24, the molecular weight of the polycarbonate was higher than in Example 24, it can be seen that by adding the catalyst, the reaction rate was increased. The polycarbonate powder obtained was a white powder and no undesirable coloration was found. The polycarbonate molded article was not colored and, was colorless and transparent.

EXAMPLE 26

Production of Polycarbonate by Process II

Basically the same procedure as in Example 24 was repeated, except that just before the poor solvent solid phase polymerization, TMAH was added as a catalyst in a proportion of $1 \times 10^{-6}$ mol per the terminal hydroxyl group, to effect the reaction. The results are shown in Table 4. Since even when the polymerization time was adjusted to 0.5 hour which was ½ of the reaction time in Example 24, the molecular weight of the polycarbonate was equivalent to that in Example 24, it can be seen that by adding the catalyst, the reaction rate was increased. The polycarbonate powder was a white powder and no undesirable coloration was found. The polycarbonate molded article was not colored, and was colorless and transparent.

EXAMPLE 27

Production of Polycarbonate by Process II

Basically the same procedure as in Example 24 was repeated, except that n-nonane (solubility parameter: 7.7 $(cal/cm^3)^{1/2}$) was substituted for the n-heptane as the poor solvent. The results are shown in Table 4. The molecular weight of the polycarbonate obtained was 19,850 which was 3.13 times the molecular weight of the oligomer. The properties of the polycarbonate powder and the properties of the polycarbonate molded article obtained were the same as in Example 24.

EXAMPLE 28

Production of Polycarbonate by Process II

Basically the same procedure as in Example 24 was repeated, except that undecane (solubility parameter: 7.8

$(cal/cm^3)^{1/2}$) was substituted for the n-heptane as a poor solvent. The results are shown in Table 4. The molecular weight of the polycarbonate obtained was 21,220 which was 3.35 times the molecular weight of the oligomer. The properties of the polycarbonate powder and the properties of the polycarbonate molded article obtained were the same as in Example 24.

EXAMPLE 29

Production of Polycarbonate by Process II

Basically the same procedure as in Example 24 was repeated, except that IP solvent manufactured by Idemitsu Petrochemical Co., Ltd. (reference number 1520, comprising mainly isoheptane, isopentane, isooctane and the like, solubility parameter: 7.6 $(cal/cm^3)^{1/2}$) was substituted for the n-heptane as a poor solvent. The results are shown in Table 4. The molecular weight of the polycarbonate obtained was 18,754 which was 2.96 times the molecular weight of the oligomer. In the properties of the polycarbonate powder and the properties of the polycarbonate molded article, the same results as in Example 24 were obtained.

EXAMPLE 30

Production of Polycarbonate by Process II

Basically the same procedure as in Example 24 was repeated, except that cyclohexane (poor solvent, solubility parameter: 8.2 $(cal/cm^3)^{1/2}$) previously heated at 220° C. was fed at a velocity of 0.0018 cm/sec in a proportion of 0.0004 liter (the normal state)/hr per g of the oligomer powder, to effect the reaction. The results are shown in Table 4. The molecular weight of the polycarbonate obtained was 17,790 which was 2.81 times the molecular weight of the oligomer. In the properties of the polycarbonate powder and the properties of the polycarbonate molded article, the same results as in Example 24 were obtained.

EXAMPLE 31

Production of Polycarbonate by Process II

According to the conventional interface polymerization method, 500 g of oligomer 100% terminated with phenyl carbonate (Mv: 8,700) and 420 g of oligomer 100% terminated with hydroxyl group (Mv: 3,240) were prepared. These were mixed so that the phenyl carbonate terminal-:hydroxyl group terminal ratio became 53 mol %:47 mol % (1.13:1.0), and dissolved in methylene chloride and then precipitated from heptane, thereby obtaining a white oligomer powder. The viscosity average molecular weight was 7,290.

To 100 g of this oligomer powder was added NaOH in a proportion of 1×10⁻⁵ per the hydroxyl group terminal so as to uniformly cover the powder therewith, and thereafter, the mixture was subjected to poor solvent solid phase polymerization in the same manner as in Example 24. The results are shown in Table 4. Even when the reaction time was adjusted to 0.5 hour which was ½ of the reaction time in Example 24, the molecular weight was 24,780 which was 3.91 times the molecular weight of the oligomer. The properties of the polycarbonate powder and the properties of the polycarbonate molded article were the same as in Example

TABLE 4

| | Oligomer production method | Oligomer Mv(−) | Crystallinity |
|---|---|---|---|
| Example 24 | Melt method | 6,330 | 3.7% |
| Example 25 | Melt method | 6,330 | 3.7% |
| Example 26 | Melt method | 6,330 | 3.7% |
| Example 27 | Melt method | 6,330 | 3.7% |
| Example 28 | Melt method | 6,330 | 3.7% |
| Example 29 | Melt method | 6,330 | 3.7% |
| Example 30 | Melt method | 6,330 | 3.7% |
| Example 31 | Melt method | 7,290 | 30.2% |

| | Oligomerpoly-merization system | Catalyst | Reaction conditions Temperature (° C.) | Pressure (Torr) | Solvent |
|---|---|---|---|---|---|
| Example 24 | Poor solvent solid phase | | 220 | Atmospheric | n-Heptane |
| Example 25 | Poor solvent solid phase | NaOH | 220 | Atmospheric | n-Heptane |
| Example 26 | Poor solvent solid phase | TMAH | 220 | Atmospheric | n-Heptane |
| Example 27 | Poor solvent solid phase | | 220 | Atmospheric | n-Nonane |
| Example 28 | Poor solvent solid phase | | 220 | Atmospheric | Undecane |
| Example 29 | Poor solvent solid phase | | 220 | Atmospheric | IP Solvent |
| Example 30 | Poor solvent solid phase | | 220 | Atmospheric | Cyclohexane |
| Example 31 | Poor solvent solid phase | NaOH | 220 | Atmospheric | n-Heptane |

| | Amount of solvent gas fed (cm/sec) | Polymerization time (hr) | Mv(−) after polymerization | Remarks |
|---|---|---|---|---|
| Example 24 | 0.031 | 1 | 22,540 | White powder, not colored |
| Example 25 | 0.026 | 0.5 | 23,110 | Same as above |
| Example 26 | 0.029 | 0.5 | 21,860 | Same as above |
| Example 27 | 0.051 | 1 | 19,850 | Same as above |
| Example 28 | 0.043 | 1 | 21,220 | Same as above |
| Example 29 | 0.024 | 1 | 18,754 | Same as above |
| Example 30 | 0.0018 | 1 | 17,790 | Same as above |
| Example 31 | 0.035 | 0.5 | 24,780 | Same as above |

As explained above referring to the Examples and the Comparative Examples, according to the process I and the process II of this invention, there is provided a process for producing a polycarbonate by which the disadvantages of the conventional method for producing a polycarbonate, particularly the solid phase polymerization method have been remedied and a high quality polycarbonate can be produced in a fewer steps with a good efficiency in a shorter time at a lower cost.

What is claimed is:

1. A process for producing a polycarbonate, comprising subjecting a polycarbonate oligomer to a solid phase polymerization in an atmosphere containing a swelling solvent gas, the swelling solvent gas being an aromatic hydrocarbon having 6 to 20 carbon atoms.

2. A process according to claim 1, wherein the polycarbonate oligomer has a terminal ratio of phenyl carbonate terminal:hydroxyl group terminal=1:4 to 4:1.

3. A process according to claim 1 or 2, wherein the polycarbonate oligomer is obtained by an interface polymerization method using a dihydroxy compound and phosgene or obtained by a molten transesterification method.

4. A process according to claim 1 or 2, wherein the polycarbonate oligomer is a phenyl carbonate-terminated oligomer obtained by an interface polymerization method said oligomer has added thereto a dihydroxy compound.

5. A process according to any one of claim 1, wherein the polycarbonate oligomer has a viscosity average molecular weight of 1,500 to 30,000.

6. A process according to any one of claim 1, wherein the polycarbonate oligomer is flaked prior to the solid phase polymerization.

7. A process according to claim 6, wherein the polycarbonate oligomer after the flaking has a particle diameter of 10 microns to 10 cm and a specific surface area of 0.10 to 30 $m^2/g$.

8. A process according to claim 1, wherein the swelling solvent is a solvent which, when gasified, is capable of converting the polycarbonate oligomer and a higher polymer thereof to a swollen state under conditions of the polymerization.

9. A process according to claim 8, wherein the swelling solvent has a boiling point such that the solvent is completely vaporized under the polymerization conditions or a vapor pressure of 50 mm Hg or more and which is capable of dissolving a pellet-form non-crystalline polycarbonate having a viscosity average molecular weight of 22,000 and a crystallinity of 0.5% in a proportion of 1.5 to 50% by weight at a temperature of 135° C. in a closed vessel.

10. A process according to claim 8 or 9, wherein the swelling solvent has a solubility parameter of 4 to 20 $(cal/cm^3)^{1/2}$.

11. A process according to claim 8, wherein said atmosphere contains at least one of (i) a gas of a poor solvent for the polycarbonate oligomer or a higher polymer thereof and (ii) an inert gas.

12. A process according to claim 11, wherein the gas of the poor solvent is a gas of at least one poor solvent selected from the group consisting of cyclic hydrocarbons having 5 to 20 carbon atoms, straight chain or branched chain saturated hydrocarbons having 4 to 18 carbon atoms and lower unsaturated hydrocarbons having 4 to 18 carbon atoms.

13. A process according to claim 11, wherein the inert gas is at least one gas selected from the group consisting of helium, argon, nitrogen, carbon dioxide and hydrocarbons having 1 to 3 carbon atoms.

14. A process according to claim 1, wherein the swelling solvent gas is fed in an amount of 0.001 to 500 cm/sec in terms of space linear velocity of gas in a reactor for carrying out the process.

15. A process according to claim 1, wherein said atmosphere is formed by feeding a solvent containing the swelling solvent to a solid phase polymerizer and vaporizing the solvent or previously vaporizing a solvent containing the swelling solvent and then feeding the resultant vaporized solvent to a solid phase polymerizer.

16. A process for producing a polycarbonate, comprising by subjecting a polycarbonate oligomer to solid phase polymerization under a stream of a poor solvent gas.

17. A process according to claim 16, wherein the polycarbonate oligomer has a terminal ratio of phenyl carbonate terminal:hydroxyl group terminal=1:4 to 4:1.

18. A process according to claim 16 or 17, wherein the polycarbonate oligomer is obtained by an interface polymerization method using a dihydroxy compound and phosgene or a molten transesterification method.

19. A process according to claim 16 or 17, wherein the polycarbonate oligomer is a phenyl carbonate-terminated oligomer obtained by an interface polymerization method said oligomer has added thereto a dihydroxy compound.

20. A process according to claim 16, wherein the polycarbonate oligomer has a viscosity average molecular weight of 1,500 to 15,000.

21. A process according to claim 16, wherein the polycarbonate oligomer is flaked prior to the solid phase polymerization.

22. A process according to claim 21, wherein the polycarbonate oligomer after the flaking has a particle diameter of 10 microns to 10 cm and a specific surface area of 0.10 to 30 $m^2/g$.

23. A process according to claim 16, wherein the poor solvent has a boiling point such that the poor solvent is completely vaporized under the conditions of the polymerization or has a vapor pressure of 50 mm Hg and is capable of dissolving a pellet-form non-crystalline polycarbonate having a viscosity average molecular weight of 22,000 and a crystallinity of 0.5% in a proportion of 0.1% by weight or less at a temperature of 135° C. in a closed vessel.

24. A process according to claim 16, wherein the poor solvent has a solubility parameter of 4 to 10 $(cal/cm^3)^{1/2}$.

25. A process according to claim 16, wherein the poor solvent is selected from the group consisting of cyclic hydrocarbons having 5 to 20 carbon atoms, straight chain or branched chain saturated hydrocarbons having 6 to 18 carbon atoms and lower unsaturated hydrocarbons having 6 to 18 carbon atoms.

26. A process according to any one of claims 16 and 23 to 25, wherein the poor solvent in a gaseous state is fed in an amount of 0.001 to 500 cm/sec in terms of space linear velocity in a reactor.

27. A process according to claim 16, wherein the poor solvent is fed to a solid phase polymerizer and then vaporized into a gas or the poor solvent is vaporized into a gas and then fed to a solid phase polymerizer.

28. A process according to claim 11, wherein at least one of (i) the swelling solvent gas, (ii) a mixed gas comprising the swelling solvent gas and the gas of a poor solvent, (iii) a mixed gas of the swelling solvent gas and the inert gas and (iv) a mixed gas of the swelling solvent gas, the gas of a poor solvent and the inert gas, is fed in an amount of 0.001 to 500 cm/sec in terms of space linear velocity of gas in a reactor.

29. A process according to claim 1, wherein the swelling solvent gas is selected from the group consisting of benzene, toluene, xylene, ethyl benzene, diethylbenzene, propylbenzene, dipropylbenzene, butylbenzene, methylstyrene, isopropylbenzene, isobutylbenzene, cymene, mesitylene, tetramethylbenzene and terphenyl.

* * * * *